United States Patent [19]

Ariyama et al.

[11] Patent Number: 5,204,725
[45] Date of Patent: Apr. 20, 1993

[54] COMPLEX MACHINE COMPRISING A HOST COMPUTER, A DUPLICATOR, A LASER PRINTER AND A SHEET SUPPLY UNIT

[75] Inventors: Takayuki Ariyama; Kiyoshi Emori, both of Toyokawa; Koji Shakushi, Toyohashi; Hiroya Sugawa, Toyokawa; Masamichi Kishi, Okazaki, all of Japan

[73] Assignee: Minolta Camera Kabushiki Kaisha, Osaka, Japan

[21] Appl. No.: 838,490

[22] Filed: Feb. 19, 1992

[30] Foreign Application Priority Data

Feb. 20, 1991 [JP] Japan ................................ 3-026159
Mar. 5, 1991 [JP] Japan ................................ 3-038400

[51] Int. Cl.⁵ .......................................... G03G 15/00
[52] U.S. Cl. ................................. 355/313; 355/309; 101/DIG. 37
[58] Field of Search ............... 355/308, 309, 313, 202, 355/271, 274; 346/160; 358/300, 401; 101/470, 471, DIG. 37

[56] References Cited

U.S. PATENT DOCUMENTS

| | | | |
|---|---|---|---|
| 3,821,931 | 7/1974 | Yamaji et al. | 101/132 |
| 3,861,306 | 1/1975 | DuBois et al. | |
| 4,080,060 | 3/1978 | Nothmann | 355/23 |
| 4,134,341 | 1/1979 | Weigele et al. | |
| 4,200,390 | 4/1980 | Tagashira et al. | |
| 4,754,300 | 6/1988 | Fukae | |
| 4,959,731 | 9/1990 | Fukae | 358/300 |
| 4,967,287 | 10/1990 | Nakatani | 355/202 X |

FOREIGN PATENT DOCUMENTS 62-2616 1/1987 Japan.

Primary Examiner—R. L. Moses
Attorney, Agent, or Firm—Willian Brinks Olds Hofer Gilson & Lione

[57] ABSTRACT

The improvement of a complex machine comprises a host computer, a duplicator, a laser printer, and a sheet supply unit. In a first sheet supply mode a sheet is supplied from the sheet supply unit to the duplicator; and in a second sheet supply mode a sheet is supplied from the sheet supply unit to the printer. The complex machine further comprises sheet transfer mode selecting means for selecting one of an interruption mode wherein the sheet supply mode currently set up is interrupted to proceed to a selected sheet supply mode, a wait mode wherein the selected sheet supply mode is effected after completing the process of the sheet supply mode currently set, and a rejection mode wherein proceeding to the selected sheet supply mode is rejected when either one of the first and second sheet supply modes is currently set up and the other one of the two sheet supply modes is selected concurrently. With the above-mentioned operation, an arbitrary selection among the interruption mode, wait mode, and rejection mode is enabled.

10 Claims, 29 Drawing Sheets

COMPLEX MACHINE COMPRISING A HOST COMPUTER, A DUPLICATOR, A LASER PRINTER AND A SHEET SUPPLY UNIT

BACKGROUND OF THE INVENTION

1. Field of the Invention

The present invention relates to a complex machine comprising a host computer such as a computer, a word processor, or an image editor; an image duplicator combined with an automatic document feeder; and a low-speed laser printer provided for the host computer.

2. Description of the Prior Art

A laser printer has been conventionally used widely as an output unit of an image editor or the like to form and edit a drawing on a word processor or a CRT display because of its capability of providing an extremely clear image. However, such a laser printer used as an output unit of a word processor or the like is generally a compact type device having a relatively low processing speed capable of printing five or six sheets per minute. This is because any document formed by means of a word processor or the like is generally small in volume seldom exceeding several hundred pages, and therefore requiring not so much time for the printing process. Another reason is that a high-speed laser printer is much more expensive as compared with a word processor or the like. Therefore, when a great amount of copies of a document formed by a word processor is necessary, there have been required such troublesome procedures that firstly an original sheet is formed by means of a word processor and then a necessary amount of copies are duplicated by means of a high-speed duplicating machine.

In view of the above-mentioned problems, there was conventionally proposed a complex machine having a printer combined with a duplicator as disclosed in the Japanese Utility Model Publication 62-2616 in which each original sheet formed by the printer is transferred onto the original sheet glass table of the duplicator and then the image of the original sheet is duplicated onto a duplication sheet by the duplicator.

However, in a compact low-speed laser printer used as an output unit of a word processor or the like, there is usually provided only one sheet supply section, and when it is required to change the sheet size, the sheet supply cassette or the sheet stored in the sheet supply cassette is to be changed. Therefore, when such a compact low-speed printer is used for the above-mentioned complex machine, there has been required troublesome procedures of confirming whether a sheet of a desired size is set up in the printer. Particularly when putting the space utility and other factors of an office into consideration, it is likely that a complex machine combining a duplicator and a printer is to be installed in a space which has been occupied by a conventional duplicating machine. The above fact means that the word processor is usually placed apart from the printer. Therefore, in a printing process, it has been required for the operator to take the troublesome actions of moving apart from the operating position of the word processor or the like to confirm whether a sheet of the desired size is set up in the sheet supply section of the laser printer.

There was conventionally proposed another complex machine in the Japanese Paten Laid-Open 61-176967 in which the printer and the duplicator are integrally combined in a common frame and each original sheet printed in the printer section is transferred onto the original sheet glass table to be subject to a duplicating process through an exposure process in the duplicator section. In the above integrated type complex machine, since a sheet supply section can be used commonly for the printer section and duplicator section, therefore even when no sheet of the desired size is in the printer section, a sheet of the desired size can be supplied from the sheet supply section provided in the duplicator.

However, in a complex machine having a printer and a duplicator combined in an integrated form, the printer section and the duplicator section must be controlled independently without any interlock operation in order to put the printing process of the printer section and the duplicating process of the duplicator section into operation at the same time, which also requires an extremely complicated design of the drive and control systems. In other words, it has been practically very difficult to put the duplicating process of the duplicator section into operation while carrying out the printing process of the printer section.

Furthermore, in the above-mentioned type of the complex machine, it is highly possible that the printing command for the printer is input independently without regard to the operating condition of the duplicator. In more detail, it can be assumed that the above-mentioned complex machine is to be installed in the place where a conventional duplicating machine has been placed apart from a word processor or the like device to give a printing command to the printer in consideration of the space utility of the office. Therefore, the operator of the word processor or the like cannot judge whether the duplicator is in operation, i.e., it is highly possible that the operator executes the printing process without confirming whether the duplicator is in operation.

If it is assumed that a printing command is given to the printer at the time the duplicator is in operation, the duplicating process of the duplicator is compulsorily interrupted to proceed into a printing process of the printer, the operator of the duplicator suffers serious inconvenience. Particularly, since the compact laser printer has a low printing speed, the operator of the duplicator must wait for a long time.

If it is assumed on the contrary that the printing process is to be compulsorily interrupted until the duplicating process of the duplicator is completed, the operator of the printer suffers inconvenience.

SUMMARY OF THE INVENTION

Accordingly, in order to solve the abovementioned problems of the conventional complex machine, it is an object of the present invention to provide a complex machine comprising a host computer such as a word processor, a duplicator, a compact low-speed laser printer, and an automatic document feeder combined without integration thereof for the purpose of adding more values to the laser printer and the duplicator with compensating the low process speed of the laser printer with the high process speed of the duplicator, having a good usability with giving resolutions to the above-mentioned problems.

According to a feature of the present invention, a complex machine comprises: a host computer 100; a duplicator 200; a sheet supply unit 300 having a plurality of sheet supply sections 301 through 304 for supplying a sheet at a sheet transfer speed V1 corresponding to the process speed of the duplicator 200; a laser printer 800 having a process speed V2 lower than the process speed of the duplicator 200; an automatic document feeder 400 for feeding an original sheet printed out by the laser printer 800 to a duplicating position on a original sheet glass table 209, the document feeder 400 being located on the top portion of the duplicator 200; a single mode setting means for setting a single mode in which one of the duplicator 200 and the laser printer 800 is alternatively put into a single operation to form an image on the sheet; a composite mode setting means for setting a composite mode in which a sheet is supplied from the sheet supply unit 300 to the laser printer 800 based on the information of an original sheet size sent from the host computer 100; and a speed changing means for changing the speed of transferring a sheet to the laser printer 800 from a sheet transfer speed V1 corresponding to the process speed of the duplicator 200 into a sheet transfer speed V2 corresponding to the process speed of the laser printer 800 when the composite mode is set for supplying a sheet from the sheet supply unit 300 to the laser printer 800.

In the above-mentioned construction, a sheet of the desired size can be supplied from the sheet supply unit 300 to the laser printer 800 in the process of the composite mode. Each sheet supplied from the sheet supply unit 300 is transferred to the laser printer 800 after being converted in speed from the sheet transfer speed V1 corresponding to the process speed of the duplicator 200 into the sheet transfer speed V2 corresponding to the process speed of the laser printer 800.

According to another feature of the invention, a complex machine further comprises: first mode setting means for setting a first sheet supply mode in which a sheet is supplied from the sheet supply unit 300 to the duplicator 200; second mode setting means for setting a second sheet supply mode in which a sheet is supplied from the sheet supply unit 300 to the printer 800; and sheet transfer mode selecting means 1109 and 1204 for selecting one of modes consisting of (a) an interruption mode in which the sheet supply mode currently set up is interrupted to proceed to a selected sheet supply mode, (b) a wait mode in which the selected sheet supply mode is effected after completing the process of the sheet supply mode currently set up, and (c) a rejection mode in which proceeding to the selected sheet supply mode is rejected and the current set mode is maintained, when either one of the first sheet supply mode and the second sheet supply mode is currently set up and the other sheet supply mode which is not currently set is selected concurrently.

In this second construction, mode selection among the interruption mode, wait mode, and rejection mode can be achieved by means of the sheet transfer mode selecting means (1109 and 1204) when the selected sheet supply mode is different from the currently set sheet supply mode. Therefore, by selecting the rejection mode or the wait mode during the process of the first sheet supply mode, there is no possibility of compulsorily selecting the second sheet supply mode, resulting in no interruption of the duplicating process. When no immediate duplicating process by means of the duplicating machine is required, priority can be given to the printing process by selecting the interruption mode.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

Figure 1:
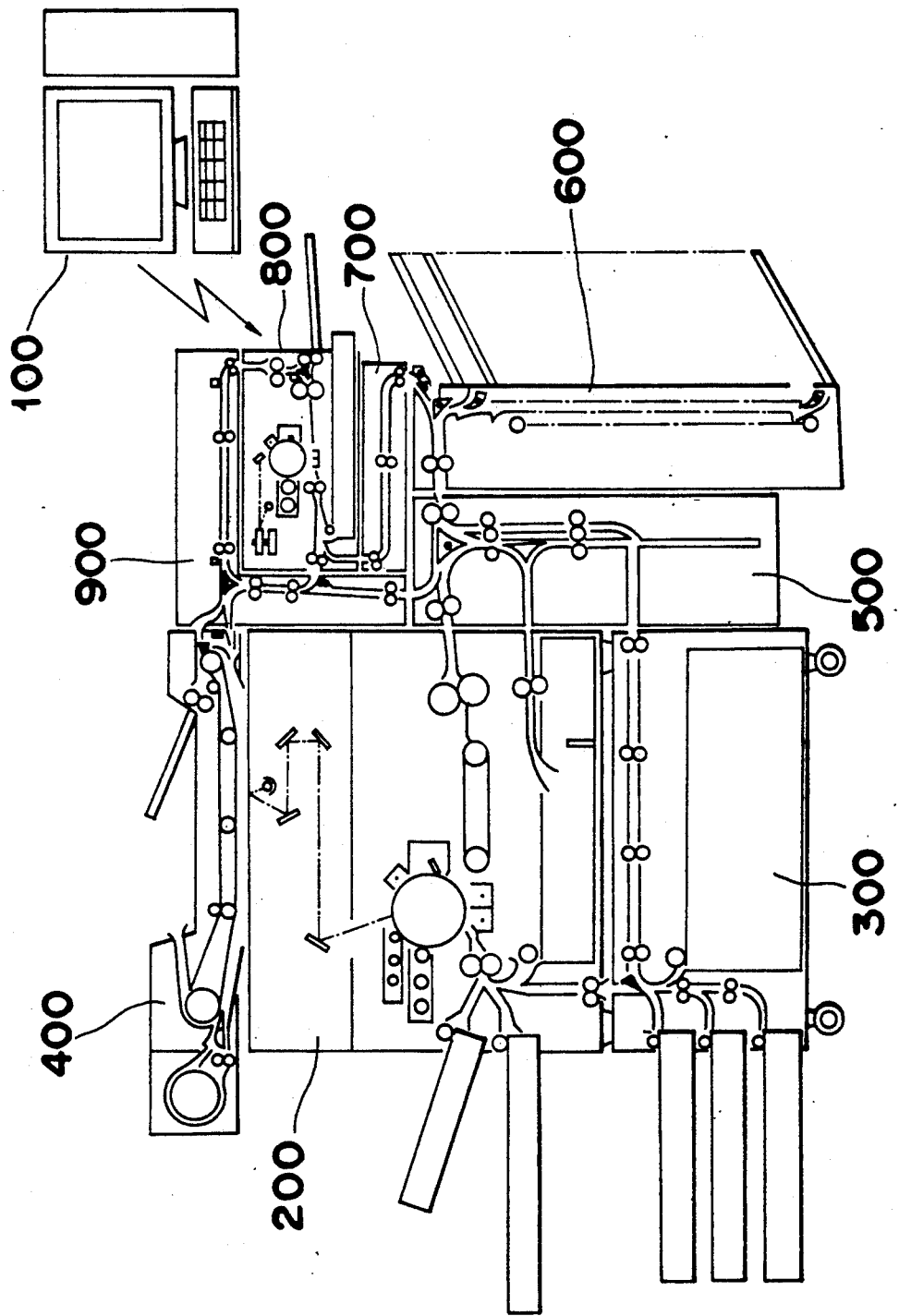
FIG. 1 is a schematic section view of a complex machine according to the present invention.

The following describes preferred embodiments in accordance with the present invention with regard to the complex machine construction, system construction, printing mode, image forming process, and system control in the above order.

I. Complex Machine Construction (Refer to FIGS. 1 through 6.)

A complex machine in accordance with the present invention comprises a host computer 100, a duplicator 200, a sheet supply unit 300, an automatic document feeder (ADF) 400, a sheet reversing unit 500, a sorter 600, a speed changing unit 700, a laser printer 800, and an original sheet transfer unit 900.

(I-a) Host computer 100 (Refer to FIG. 1)

The host computer 100 consists of, for example, a personal computer, a word processor, or an image editor for editing a drawing on a CRT display.

Figure 2:
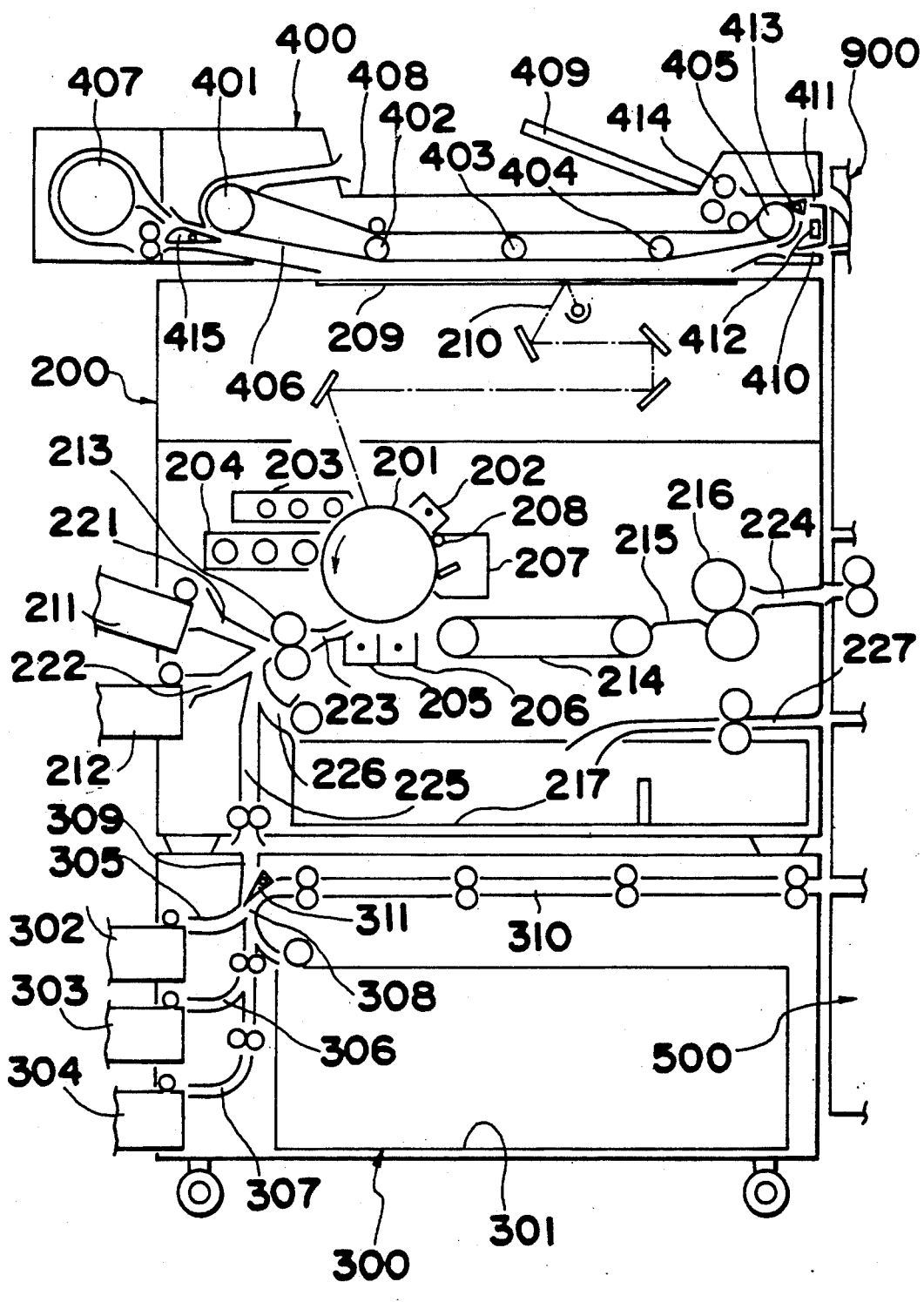
FIG. 2 is a section view of a duplicator, a sheet supply unit, and an automatic sheet feeder.

(I-b) Duplicator 200 (Refer to FIG. 2)

The duplicator 200 is a kind of high-speed duplicator having a capability of duplicating several tens of sheets per minute, which comprises an electrostatic charger 202, a color developing unit 203, a monochrome developing unit 204, an image transfer charger 205, a sheet separating charger 206, a cleaning unit 207, and an eraser 208 around a photosensitive drum 201 as well as an optical scanning system 210 below the original sheet glass table 209.

Referring to FIG. 2, two cassette sheet supply sections 211 and 211 and a timing roller 213 are provided at the left of the image transfer charger 205. On the other hand, a sheet transfer belt 214, a guide plate 215, and an image fixing unit 216 are provided at the right of the sheet separating charger 206, while a center tray 217 is installed below the sheet transfer belt 214.

The duplicator 200 is further provided with guide paths 221 and 222 for guiding the sheet transferred from the sheet supply sections 211 and 212 to the timing roller 213, a guide path 223 for guiding the sheet from the timing roller 213 to a portion facing the transfer charger 205, a guide path 224 for guiding the sheet from the image fixing unit 216 to the sheet reversing unit 500, a guide path 225 for guiding the sheet supplied from the sheet supply unit 300 to the timing roller 213, a guide path 226 for guiding the sheet supplied from the center tray 217 to the timing roller 213, and a guide path 227 for guiding to the center tray 217 the sheet which is fed back from the sheet reversing unit 500 to the duplicator 200.

(I-c) Sheet supply unit 300 (Refer to FIG. 2)

The sheet supply unit 300 is located below the duplicator 200 while supporting the duplicator 200 and is provided with a sheet supply section 301 installed therein and three sheet supply cassettes 302, 303, and 304. The sheet supply unit 300 is further provided with paths 305, 306, and 307 for transferring upward the sheet supplied from the sheet supply cassettes 302, 303, and 304, a path 309 extending upward from a junction 308 of the paths 305, 306, and 307 and communicated with the path 225 of the duplicator 200, a path 310 extending horizontally from the junction 308 to the sheet reversing unit 500. The junction 308 is provided with a sheet diverter 311.

(I-d) Automatic document feeder (ADF) 400 (Refer to FIG. 2)

The automatic document feeder 400 is mounted on the duplicator 200 operably in opening and closing. The automatic document feeder 400 is provided with a belt 406 rotatable forwardly and reversely around roller units 401 through 405, an original sheet reversing unit 407 for reversing the original sheet, an original sheet outlet tray 408, and an original sheet inlet tray 409. The automatic document feeder 400 is also provided with a path 410 for guiding the original sheet transferred from the original sheet transfer unit 900 to the lower surface of the belt 406, a path 411 for transferring the original sheet placed on the original sheet tray 409 to the original sheet transfer unit 900, and a sheet detecting sensor 412 placed beside the path 410 for detecting the document sheet transferred from the original sheet transfer unit 900 via the path 410 to the automatic document feeder 400. The automatic document feeder 400 is further provided with a sheet diverter 413 for diverting the sheet supplied from the original sheet inlet tray 409 to the path 411 or onto the original sheet glass table 209 as located between the path 411 and the transfer belt 406, and a sheet diverter 415 for diverting the sheet transferred from the original sheet glass table 209 to the sheet reversing unit 407 or to the original sheet outlet tray 408 as located below the roller 401.

Figure 3:
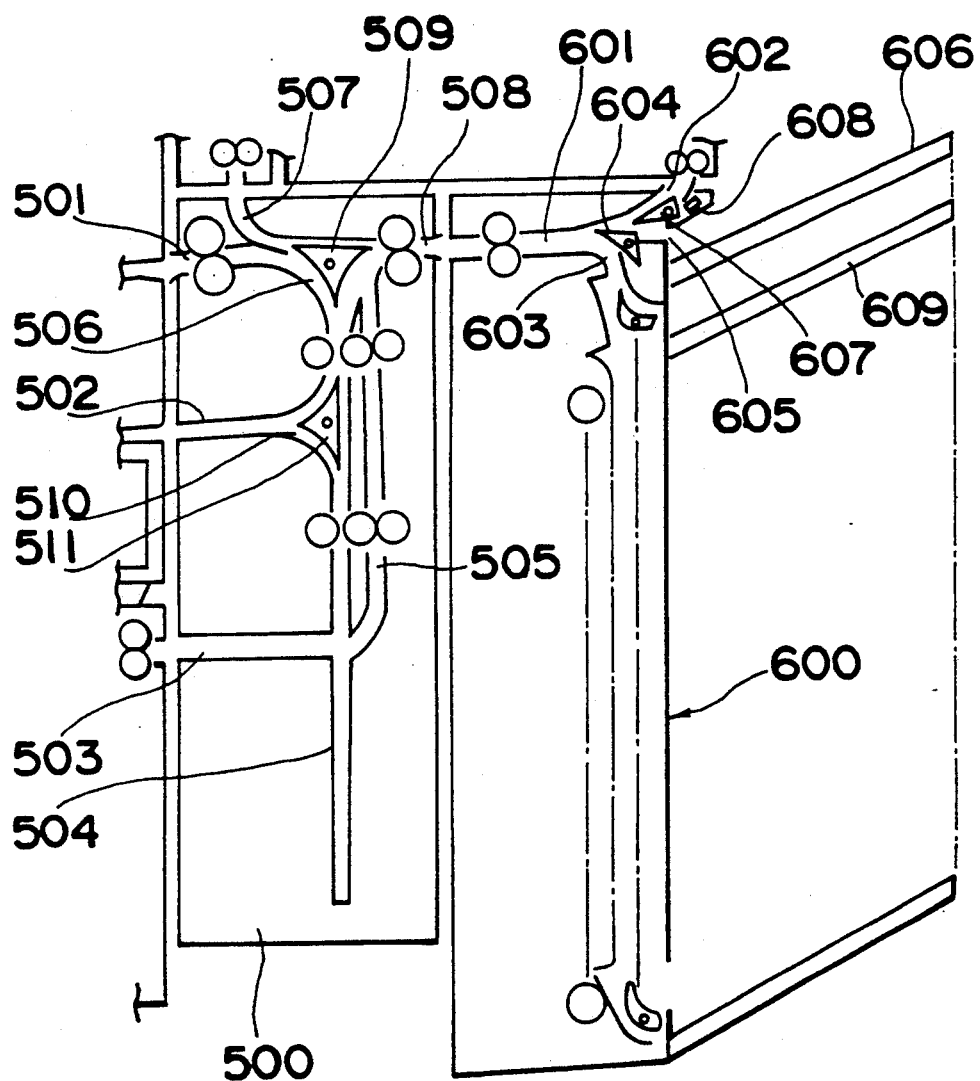
FIG. 3 is a section view of a sheet reversing unit and a sorter.

(I-e) Sheet reversing unit 500 (Refer to FIG. 3)

The sheet reversing unit 500 is located at the right of the duplicator 200 and the sheet supply unit 300 and is provided with a path 501 communicated with the image fixing unit 216 in the duplicator 200, a path 502 communicated with the center tray 217, and a path 503 communicated with the horizontal path 310 in the sheet supply unit 300. The paths 501 and 502 are communicated with a sheet reversing path 504 extending vertically, while the lowermost path 503 traverses the sheet reversing path 504 to be communicated with the vertical path 505 which is communicated with the sheet reversing path 504 at its upper portion. A junction 506 of the sheet reversing path 504, vertical path 505, and the uppermost path 501 is communicated with a path 507 extending aslant upward to the original sheet transfer unit 900 and a path 508 extending to the sorter 600. In the junction 506, there is provided a sheet diverter 509 of which angle can be varied to divert the sheet transferred from the uppermost path 501 or the original sheet transferred via the path 507 from the original sheet transfer unit 900 to the sheet reversing path 504 or the path 508. At a junction 510 between the sheet reversing path 504 and the middle path 502, there is provided a sheet diverter 511 of which the locating angle can be varied to divert the sheet transferred from the upper portion to the sheet reversing path 504 to the lower portion of the sheet reversing path 504 or to the path 502 communicated with the center tray 217.

(I-f) Sorter 600 (Refer to FIG. 3)

The sorter 600 is provided with a path 601 communicated with the path 508 of the sheet reversing unit 500. The path 601 branches into two paths 602 and 603, while the path 602 has a branch of a path 605 which is communicated with an uppermost bin 606. At the branch portion of the paths 602 and 603, there is provided a sheet diverter 604, while the branch portion of the paths 602 and 605, there is provided a sheet diverter 607. Beside the path 602, there is provided a sheet detecting sensor 608.

Figure 4:
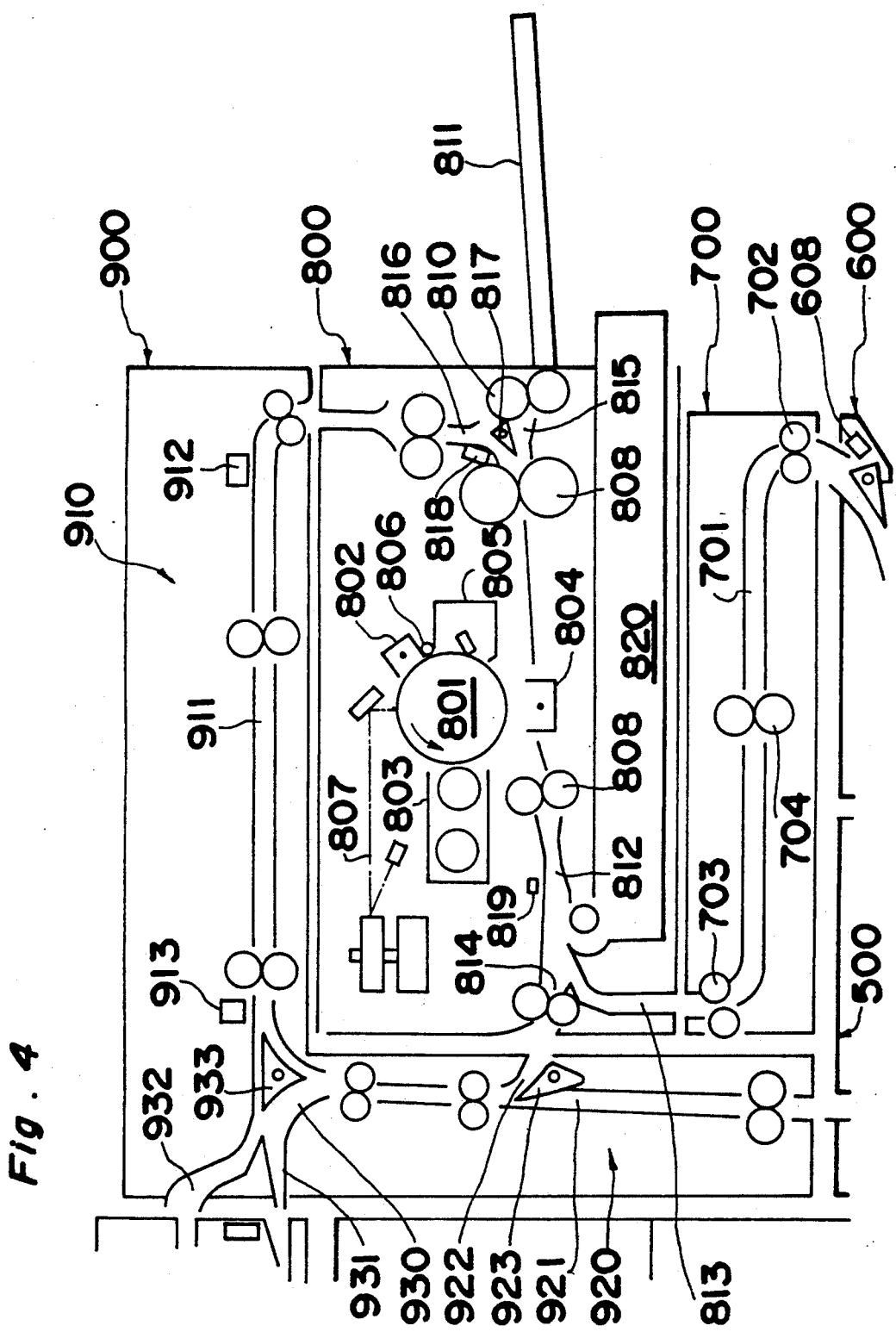
FIG. 4 is a section view of a speed changing unit, a laser printer, and an original sheet transfer unit.

(I-g) Speed changing unit 700 (Refer to FIG. 4)

The speed changing unit 700 is provided with a path 701 for transferring a sheet from the sorter 600 to the laser printer 800. The path 701 is provided with a roller 702 near the sorter, a roller 703 near the laser printer, and a roller 704 at the intermediate portion thereof.

(I-h) Laser printer (LBP) 800 (Refer to FIG. 4)

The laser printer 800 is a kind of compact low-speed printer used as a printing unit for a word processor or the like, which is provided with an electrostatic charger 802, an image developing unit 803, an image transfer charger 804, a cleaning unit 805, and an eraser 806 around a photosensitive drum 801. The laser printer 800 is also provided with a laser optical system 807 at the upper portion thereof, a sheet supply section 820 at the bottom portion thereof, a timing roller 808 at the left of the image transfer charger 804, an image fixing unit 809 at the right of the transfer charger 804, a sheet ejecting roller 810, and a sheet outlet tray 811. The printer 800 is further provided with a path 812 for transferring the sheet in the sheet supply section 820 to the position of the timing roller 808. The path 812 is communicated with a path 813 extending to the path 701 of the speed changing unit 700 and with a path 814 extending to the original sheet transfer unit 900. Between the image fixing unit 809 and the sheet ejection roller 810, there are provided a path 815 extending to the sheet outlet tray 811 and a path 816 extending upward. The sheet passing through the image fixing unit 809 is diverted to one of the paths 815 and 816 by means of a sheet diverter 817.

It is noted that the system process speed of the laser printer 800, i.e., the sheet transfer speed V2 is slower than the system process speed (sheet transfer speed) V1 of the above-mentioned duplicator 200, the laser printer 800 having a capability of printing five to six pages per minute.

(I-i) Original sheet transfer unit 900 (Refer to FIG. 4)

The original sheet transfer unit 900 consists of a horizontal sheet transfer unit 910 and a vertical sheet transfer unit 920. The horizontal sheet transfer unit 910 is provided with a horizontal path 911 which is communicated with the path 816 of the laser printer 800. The vertical sheet transfer path 920 is provided with a vertical path 921 which is communicated with the path 507 of the sheet reversing unit 500, while the intermediate portion of the vertical path 921 branches into a path 922 which is communicated with the path 814 of the laser printer 800. At the above branch portion, there is provided a sheet diverter 923 for diverting the sheet transferred through the path 921 from the upper portion to the lower portion of the path 921 or to the path 922. The horizontal path 911 and the vertical path 921 are joined together at a junction 930 of both the units 910 and 920. The junction 930 branches into two paths 931 and 932 which are communicated respectively with the paths 410 and 411 of the automatic document feeder 400. At the junction 930, there is provided a sheet diverter 933 which selectively diverts the sheet transferred from the right portion of the horizontal path 911 to any one of the paths 931 and 932 communicated with the automatic document feeder 400 or to the vertical path 921.

Figure 5:
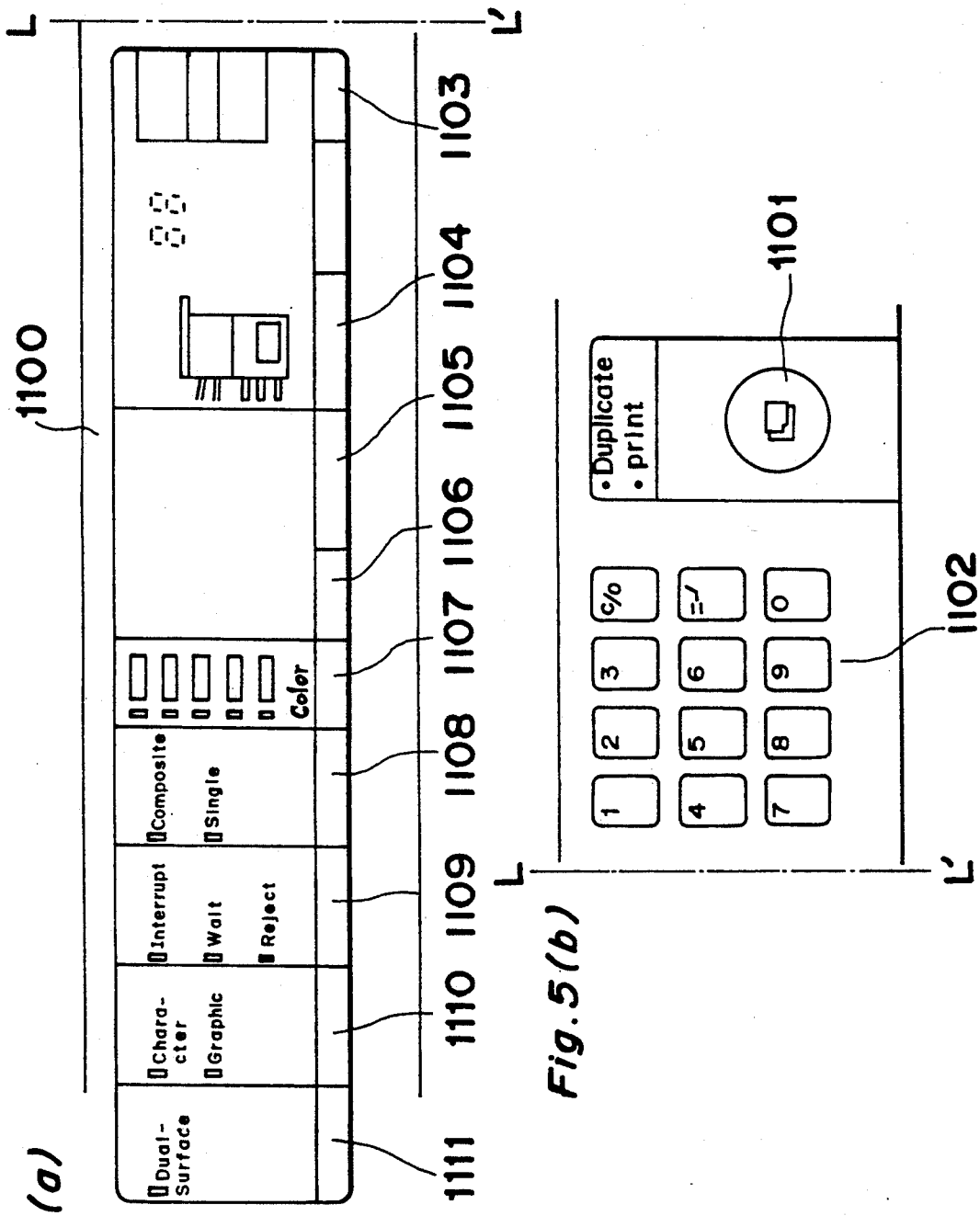
FIGS. 5a and 5b are plan views of the operation panel of the duplicator.
Figure 6:
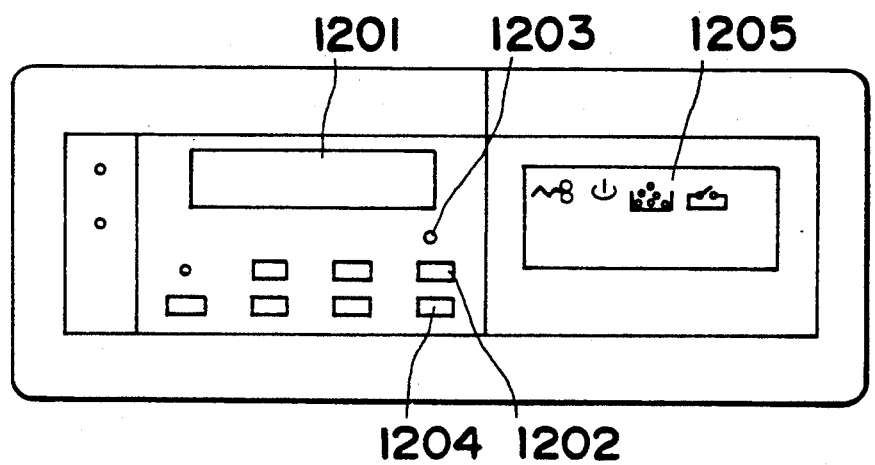
FIG. 6 is a plan view of the operation panel of the laser printer.

(I-j) Operation panels 1100 and 1200 (Refer to FIGS. 5 and 6)

The duplicator 200 is provided with an operation panel 1100 as shown in FIG. 5. The operation panel 1100 is provided with a variety of keys consisting of a duplication start button 1101, a group of numeral keys 1102, a density adjusting switch 1103, a sheet selector switch 1104, a magnification ratio selecting switch 1105, a zoom setting switch 1106, a color selector switch 1107, a mode selector switch 1108 for selecting between a composite mode and a single mode as to be described hereinafter, a sheet transfer mode selector switch 1109 for selecting among an interruption mode, a wait mode and a rejection mode as to be described hereinafter, an image quality input switch 1110, and a dual surface duplication selector switch 1111.

The printer 800 is provided with an operation panel 1200 as shown in FIG. 6. The operation panel 1200 is provided with a variety of keys consisting of an indicator panel 1201, a mode selector switch 1202 for selecting between the composite mode and the single mode, a composite mode indicator lamp 1203 for indicating that the composite mode is currently selected, a sheet transfer mode selector switch 1204 having the same function as that of the sheet transfer mode selector switch 1109 (therefore, any one of the switches 1109 and 1204 can be omitted), and a graphic display section 1205 for displaying the printer conditions such as a trouble condition with a graphic picture.

II. System Construction

Figure 7A:
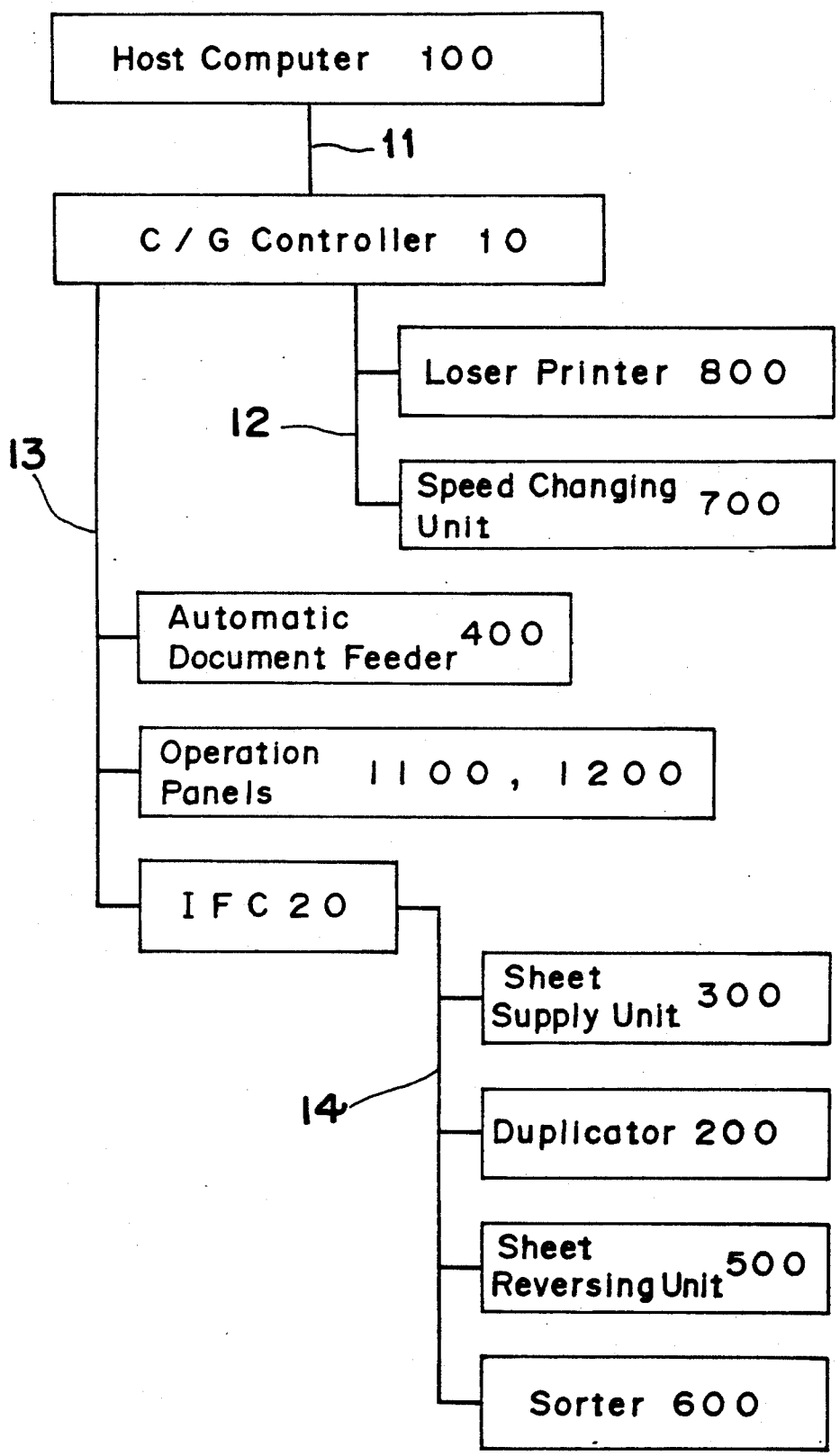
FIGS. 7a and 7b are block diagrams each showing a system construction of the complex machine.
Figure 7B:
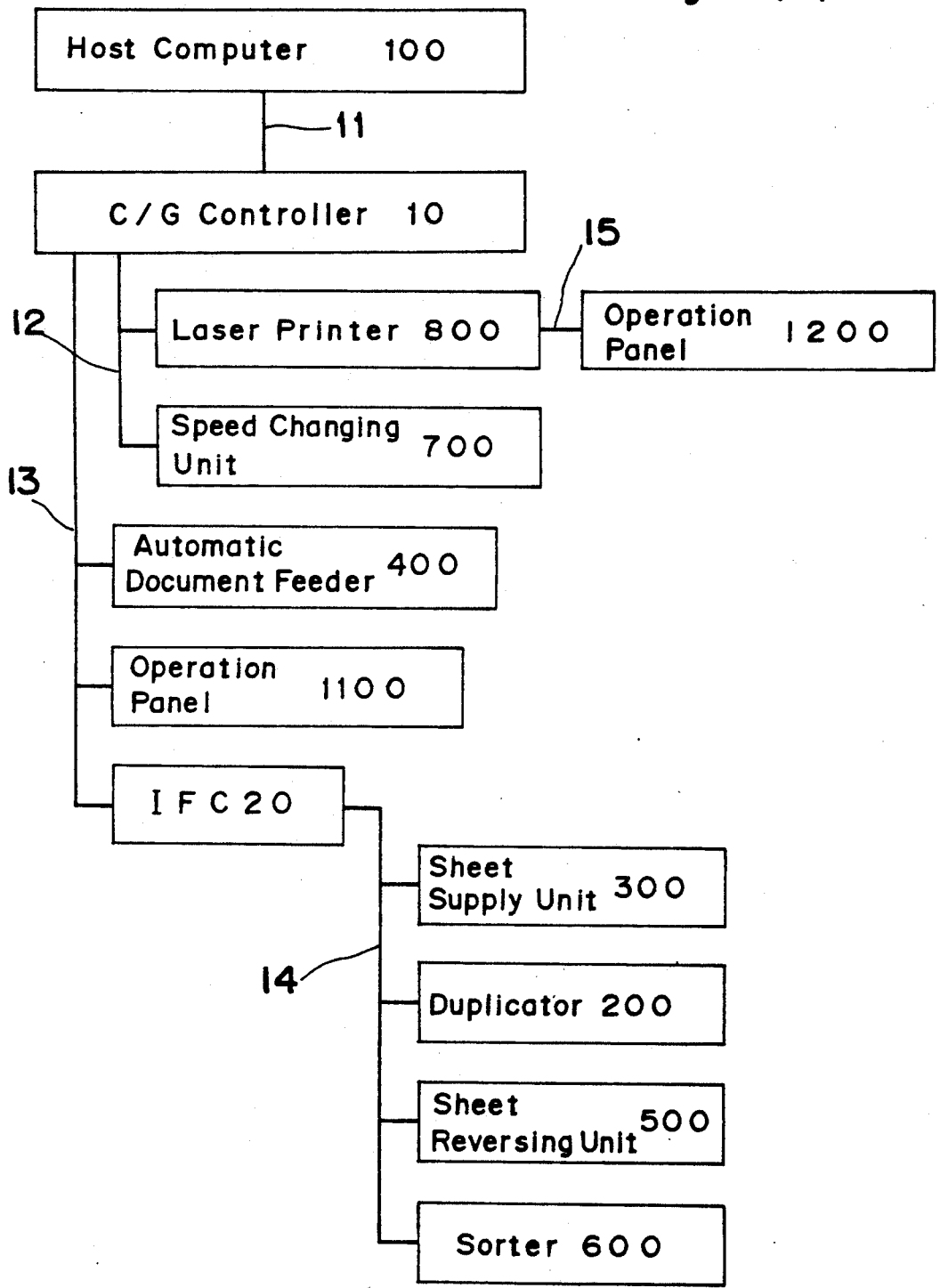

FIGS. 7a and 7b show the system construction of the complex machine in which the host computer 100 produces printing data of an image to be formed by the laser printer 800 and generates control signals necessary for controlling the laser printer 800, the duplicator 200, and other units. A C/G controller 10 is connected to the host computer 100 via a host interface 11. The C/G controller 10 transmits the necessary control signals to the optional units such as the laser printer 800 based on the signals applied thereto from the host computer 100 and also receives condition signals from the laser printer 800 and the like.

In the first embodiment as shown in FIG. 7a, the operation panel 1200 is controlled by the laser printer 800, wherein both the panel 1200 and the printer 800 are connected via a communication line 15 which serves as an input/output bus. The speed changing unit 700 and the laser printer 800 are connected in parallel via a video interface 12 and both are connected to the controller 10. An interface controller (IFC) 20, the automatic document feeder 400, and the operation panel 1100 are connected to the controller 10 in parallel via a communication line 13. The interface controller 20 is also connected via a communication line 14 to the duplicator 200, the sheet supply unit 300, the sheet reversing unit 500, and the sorter 600

The second embodiment as shown in FIG. 7b has a construction similar to that of the first embodiment except that both the operation panels 1100 and 1200 are connected via the communication line 13 to the controller 10, which is different from the first embodiment.

III. Printing Mode

The first and second embodiments of the complex machine constructed as mentioned above are capable of executing the following printing modes.

III-A. Single Mode

(A-1) Single Duplication Mode by means of the Duplicator

The present mode is to duplicate the image of an original sheet set on the original sheet glass table 209 by means of the duplicator 200 to form the image on the sheet supplied from the sheet supply sections 211 and 212 provided in the duplicator 200 or on the sheet supplied from the sheet supply sections 301, 302, 303, and 304 provided in the sheet supply unit 300. The present mode includes a single-surface duplication mode for duplicating an image on one surface of each sheet, a dual-surface duplication mode for duplicating an image on both surfaces of each sheet, and a compound duplication mode for duplicating two images compositely on one surface of each sheet

(A-2) Single Printing Mode by means of the Printer

The present mode is to print a character or a figure by means of the printer on the sheet supplied from the sheet supply section 820 of the printer 800 through a single operation of the laser printer 800 based on command transmitted from the host computer 100.

The above-mentioned single duplication mode by means of the duplicator and the single printing mode by means of the printer can be effected simultaneously.

III-B. Composite Mode

The present mode is to form an image by means of the printer 800 and other units such as the duplicator 200 and sheet supply unit 300 based on a command transmitted from the host computer 100. In more detail, in the present mode, sheets are supplied from the sheet supply unit 300 and the image of an original sheet formed by the printer 800 is duplicated based on a command transmitted from the host computer 100.

IV. Image Forming Process

The following describes the image forming process of each of the above-mentioned printing modes.

IV-A. Single Duplication Mode by means of the Duplicator

In the present duplication mode, the switch units on the operation panel 1100 of the duplicator 200 are operated to effect selection between the single-surface, dual-surface, and compound duplication modes, selection of sheet supply section, selection of the color of the image to be developed, etc. and also to input the number of sheets for image duplication. Each original document is placed in a prescribed position of the original sheet glass table 209 after opening the automatic document feeder 400. When the image duplicating process is completed, the original document shall be removed after opening the automatic document feeder 400.

When automatically supplying an original sheet by means of the automatic document feeder 400, upon setting the original sheet on the original sheet inlet tray 409 and pressing the print start button 1101, the automatic original sheet feeding mode is automatically selected. With the above operation, the original sheet is automatically fed to the duplicating position on the original sheet glass table 209 by means of an original sheet feeding roller 414, the sheet transfer belt 406, and the like. When the duplicating process is completed, the original sheet is ejected from the duplicating position by driving the sheet transfer belt 406 and is guided onto the original sheet outlet tray 408 by the sheet diverter 415. When a plurality of original sheets are set on the original sheet inlet tray 409, the original sheets are successively fed to the duplicating position on the original sheet glass table 209.

When a dual-surface duplication mode for duplicating the images of both surfaces of one original sheet is selected in the automatic document feeding mode by means of the automatic document feeder 400, the original sheet with its one surface subjected to an image duplication process is guided to the sheet reversing unit 407 by the sheet diverter 415 so as to be reversed and then the reversed original sheet is transferred to the duplicating position on the original sheet glass table 209.

When the print start button 1101 is pressed in the duplicator 200, the photosensitive drum 201 is rotated at a prescribed system speed V1 counterclockwise as represented by an arrow a shown in FIG. 2, whereby the outer peripheral surface of the photosensitive drum 201 is uniformly charged with electrostatics by the operation of the electrostatic charger 202. In the meantime, the optical system 210 scans the original sheet while illuminating the sheet, so that the charged area of the photosensitive drum 201 is exposed to the reflected light from the original sheet thereby to form a latent electrostatic image on the photosensitive drum 201. The latent electrostatic image is visualized as a toner image by the color developing unit 203 or the monochrome developing unit 204 and then the visualized toner image is transferred onto a duplication sheet at a portion facing the image transfer charger 205. Note that the duplication sheet is selectively supplied from one of the sheet supply sections 301 through 304 of the sheet supply unit 300 or one of the sheet supply sections 211 and 212 of the duplicator 200 to be transferred to the portion facing the image transfer charger 205 by the timing roller 213 in synchronization with the above-mentioned toner image at the sheet transfer speed V1 as same as the system speed V1 of the photosensitive drum 201. In the present duplication mode, the sheet diverter 311 in the sheet supply unit 300 is set at the position where each sheet supplied from one of the sheet supply sections 301 through 304 is guided to the path 225 of the duplicator 200.

The sheet having a toner image transferred thereon is separated from the photosensitive drum 201 by the sheet separating charger 206 and is thereafter transferred to the image fixing unit 216 at the sheet transfer speed V1 by the sheet transfer belt 214. The toner image transferred onto the duplication sheet is fixed to the sheet by the image fixing unit 216, and the duplication sheet having the toner image fixed thereto is then ejected via the path 224 to the sheet reversing unit 500. On the other hand, the photosensitive drum 201 which has released the toner image is cleaned by the cleaning unit 207 removing the remaining toner and then the remaining electrostatic charge is erased by the illumination generated by the eraser 208.

The duplication sheet ejected from the duplicator 200 is transferred through one of different paths according to the selected duplication mode. That is, when the single-surface duplication mode is selected, the duplication sheet transferred to the sheet reversing unit 500 is guided by the sheet diverter 509 to the path 508 communicated with the sorter 600 and then ejected to a bin 606 or a bin 609 by the sheet diverters 604 and 607 in the sorter 600.

When the dual-surface duplication mode is selected, the duplication sheet transferred to the sheet reversing unit 500 is guided downward through the sheet reversing path 504 by the sheet diverter 509 and then transferred upward through the sheet reversing path 504 again to be transferred to the center tray 217 of the duplicator 200 via the middle path 502 by the sheet diverter 511. The duplication sheet stored in the center tray 217 is transferred to the path 226 and then transferred to the portion facing the image transfer charger 205 by the timing roller 213 so as to transfer another toner image on the back surface thereof. The duplication sheet having a toner image transferred on the back surface thereof is carried to the sheet reversing unit 500 so as to be guided to the sorter 600 via the path 508 by the sheet diverter 506. Thereafter, the duplication sheet is ejected to the bin 606 or bin 609 by the guidance of the sheet diverter 604 or 607.

When the composite duplication mode is selected, the duplication sheet with its front surface subjected to an image duplication process is transferred to the sheet reversing unit 500 and transferred to the center tray 217 of the duplicator 200 by the two sheet diverters 509 and 511 without any sheet reversing process to receive another image on the front surface again and then ejected to the sorter 600.

IV B. Single Printing Mode by means of the Printer

In the present printing mode, image data is transmitted from the host computer 100 to the controller 10. In the controller 10, the transmitted image information is allocated on a bit map and the allocated image data is applied to the laser printer 800.

In the laser printer 800, the laser optical system 807 is operated according to the image information to form a latent electrostatic image on the outer peripheral surface of the photosensitive drum 801 which is rotating as charged by the electrostatic charger 802. The latent electrostatic image is visualized as a toner image by the image developing unit 803. In the meantime, a duplication sheet is supplied from the sheet supply section 820 of the laser printer 800 via the path 812 and transferred to a portion facing the transfer charger 804 in synchronization with the above-mentioned toner image by the timing roller 808 thereby to receive the toner image transferred thereon depending on the electric discharge generated by the transfer charger 804. The duplication sheet having the toner image transferred thereon is passed through the image fixing unit 809 so as to be ejected to the tray 811 by the sheet ejecting roller 810. On the other hand, the photosensitive drum 801 which has released the toner image is cleaned by the cleaning unit 805 and the eraser 806.

It is noted that the printing speed of the laser printer 800, i.e., the sheet transfer speed V2 of the laser printer 800 is slower than the sheet transfer speed V1 of the duplicator 200, sheet supply unit 300, automatic document feeder 400, sheet reversing unit 500, and the sorter 600. Therefore, the laser printer 800 is capable of printing only five to six pages per minute.

IV-C. Composite Mode

The composite mode can be roughly classified into a first composite mode wherein a sheet for the laser printer 800 is supplied from the sheet supply unit 300 concerning the sheet supply operation and a second composite mode wherein the original sheet formed by the laser printer is duplicated by the duplicator 200 concerning the original sheet. It is noted that both the first and second composite modes can be effected simultaneously.

(C-1) First Composite Mode Concerning Sheet Supply

In the composite mode concerning the sheet supply, since the laser printer 800 has only one sheet supply section, i.e., since only one type of sheet is stored, when another type of sheet is designated by the host computer 100, a sheet of the designated size is supplied from the sheet supply unit 300.

Practically, when a sheet of the designated size is not stored in the sheet supply section 820 of the printer but stored in the sheet supply unit 300, the sheet supply unit 300 supplies the sheet of the designated size from one of the sheet supply sections 301 through 304 storing the sheet of the designated size according to a command sent from the host computer 100. The sheet ejected from the sheet supply section is guided to the path 310 by the sheet diverter 308 and transferred to the sheet reversing unit 500. The sheet transferred to the sheet reversing unit 500 is guided through the path 503 to the vertical path 505 and then guided to the path 601 of the sorter 600 by the sheet diverter 509. The sheet is then guided via the speed changing unit 700 to the laser printer 800 by the sheet diverters 604 and 607.

Herein, the sheet is transferred at the sheet transfer speed V1 (high speed) of the sheet supply unit 300, sheet reversing unit 500, and the sorter 600 until reaching the speed changing unit 700. In the speed changing unit 700, the rotating speed of the roller 704 and other relevant parts is changed to a low speed (sheet transfer speed V2) slower than the sheet transfer speed V1 upon detecting the trailing end of the original sheet by the original sheet detecting sensor 608. Consequently, the sheet is supplied to the laser printer 800 at the low speed. The above-mentioned speed changing control is described more in detail in [(V)–(xi): Speed Changing System Control] hereinafter.

(C-2) Second Composite Mode Concerning Original Sheet (a) In the case of single-surface duplication mode In the composite single-surface duplication mode, an original image is formed by the laser printer 800 according to an image information transmitted from the host computer 100. In the meantime, the sheet for forming an original document is supplied from the sheet supply section 820 of the laser printer 800 or from the sheet supply sections 301 through 304 of the sheet supply unit 300.

When the sheet for forming an original is supplied from the sheet supply unit 300, the sheet is transferred at a high speed (sheet transfer speed V1) in the processes before the sheet is transferred to the speed changing unit 700, and thereafter the sheet is supplied to the laser printer 800 at the adjusted system speed (sheet transfer speed V2) in the same manner as in the previous composite mode concerning sheet supply.

In the laser printer 800, there is formed an image on the above-mentioned sheet and the sheet with an image formed is ejected to the original sheet transfer unit 900. In the original sheet transfer unit 900, the original sheet is transferred along the path 911. In the meantime, the original sheet transfer speed coincides with the sheet ejecting speed of the laser printer 800. In the original sheet transfer unit 900, the original sheet is detected by means of the original sheet detecting sensors 912 and 913 so as to be guided through the path 931 to the path 410 of the automatic document feeder 400 by means of the sheet diverter 933. When a plurality of original sheets are successively formed by the laser printer 800, each of the original sheets ejected to the original sheet transfer unit 900 once wait in the path 911 and then transferred to the automatic document feeder 400 in synchronization with the operations of the duplicator 200 and the automatic document feeder 400.

Each original sheet supplied to the path 410 of the automatic document feeder 400 is then transferred to the duplicating position on the original sheet glass table 209 by the rotation of the sheet transfer belt 406.

In the duplicator 200, the photosensitive drum 201, the optical system 210, the image developing units 203 and 204 and the like are operated on the original sheet set at the duplicating position, thereby executing a duplicating operation on a prescribed amount of sheets supplied from one of the sheet supply sections 211 and 212 or from one of the sheet supply sections 301 through 304 of the sheet supply unit 300. Each sheet which has received the image of the original sheet is passed through the image fixing unit 216, and the sheet is then transferred via the paths 224 and 501 to the sorter 600 to be sorted out appropriately into the bins 606, 609, and other bins.

In the automatic document feeder 400, after completing the exposure process on the original sheet by the optical system 210, the sheet transfer belt 406 is rotated and the original sheet is ejected to the original sheet outlet tray 408.

When original sheets are sorted out into the sorter 600, the sheet transfer belt 406 is rotated reversely when the exposure process on each original sheet is completed, and each original sheet is once ejected onto the original sheet inlet tray 409. The original sheets collected in the original sheet inlet tray 409 are supplied successively by the sheet supply roller 414 to be guided to the path 411 by the sheet diverter 413 when the duplication process of all the original sheets formed by the laser printer 800 is completed. Each original sheet which has passed through the path 411 is then transferred to the path 932 of the original sheet transfer unit 900 so as to be guided to the vertical path 921 by the sheet diverter 933. The original sheet transferred downward through the vertical path 921 is guided to the path 507 of the sheet reversing unit 500 and then guided via the path 508 to the path 601 of the sorter 600 by the sheet diverter 509. The sorter 600 sorts out the original sheets into the bins in which the duplication sheets of the corresponding image are stored. In other words, each original sheet formed by the laser printer 800 is treated as a duplication sheet. When only one original sheet is formed by the laser printer 800, the original sheet may be once ejected to the original sheet inlet tray 409 to be thereafter transferred to the sorter 600, or directly transferred to the sorter 600 without being ejected to the original sheet inlet tray 409.

(b) In the case of dual-surface duplication

When the dual-surface duplication mode is selected, an original sheet for front surface duplication is formed by the laser printer 800 and the formed original sheet is then set at the duplicating position on the original sheet glass table 209. In the duplicator 200, the image of the original sheet for front surface duplication is duplicated to one surface (front surface) of a duplication sheet. The duplication sheet having the original image duplicated on the front surface thereof is guided to the sheet reversing path 504 of the sheet reversing unit 500 so as to be reversed in a switchback manner and then transferred via the paths 502 and 227 to the center tray 217.

Then the laser printer 800 forms an original sheet for back surface duplication, and the formed original sheet is set at the duplicating position on the original sheet glass table 209. In the duplicator 200, the sheet stored in the center tray 217 is supplied for the back surface duplication so that the image of the original sheet for back surface duplication is duplicated on the back surface of the duplication sheet.

Thus, the duplication sheet which has received the images duplicated on both the front and back surfaces thereof as described above is then transferred via the sheet reversing unit 500 to the sorter 600 to be ejected to the prescribed bin. In the meantime, each of the original sheets successively set on the original sheet glass table 209 is ejected to the tray 408 after completing an image duplication process.

When two images are formed respectively on the front and back surfaces of a duplication sheet by the laser printer 800 and subject to a dual-surface duplication process, the original sheet which has received the images on the front surface thereof is ejected to the original sheet transfer unit 900 so as to be guided via the horizontal path 911 of the horizontal unit 910 to the vertical path 921 of the vertical unit 920 by the sheet diverter 933. The original sheet is guided via the path 921 to the path 507 and the sheet reversing path 504 of the original reversing unit 500 to be reversed there in a switchback manner and guided via the path 508 to the sorter 600 by the sheet diverter 509. The original sheet is further guided via the paths 601 and 602 to the speed changing unit 700 and transferred again via the path 701 to the laser printer 800 where the image is formed on the back surface of the original sheet. The original sheet which has received the images on the front and back surfaces thereof is transferred via the original sheet transfer unit 900 to the automatic document feeder 400. In the automatic document feeder 400, the original sheet is firstly set at the duplicating position with the back surface thereof facing downward When the exposure process of the image is completed, the original sheet is transferred to the sheet reversing unit 407 to be reversed, and the original sheet is then set at the duplicating position with the front surface thereof facing downward When the exposure process of the images for both the front and back surfaces is completed, the original sheet is once ejected to the original sheet supply tray 409, and after completing the exposure process of all the original sheets, the original sheets are sorted out into the sorter 600. While in the duplicator 200, each duplication sheet is reversed according to the normal dual-surface duplication mode to duplicate the images of the original sheet on both the front and back surfaces of the duplication sheet and then ejected to the sorter 600.

(c) In the case of compound duplication

When the images of two original sheets formed by the laser printer 800 are duplicated synthetically on one surface of a duplication sheet, the duplication sheet having one of the two images formed on the front surface thereof is once stored in the center tray 217 without reversing the sheet and is supplied again to the duplicating position so as to receive the other image on the same surface thereof in the duplicator 200. In more detail, the duplication sheet transferred from the duplicator 200 to the sheet reversing unit 500 is guided directly to the path 502 via the path 501, and the duplication sheet is not reversed in the reversing path 504. The other movements of the duplication sheet are as same as those in the dual-surface duplication mode.

In the case of the dual-surface duplication mode or the compound duplication mode, in the duplicator 200, it is possible to change the image developing unit used at the first time to the developing unit used at the second time, thereby to vary the image developing tone, or to form a two-tone compound duplication image.

V. System Control

The following is a detailed description of the control of the constituent units of the system as shown in FIG. 7a (FIG. 7b).

Figure 8:
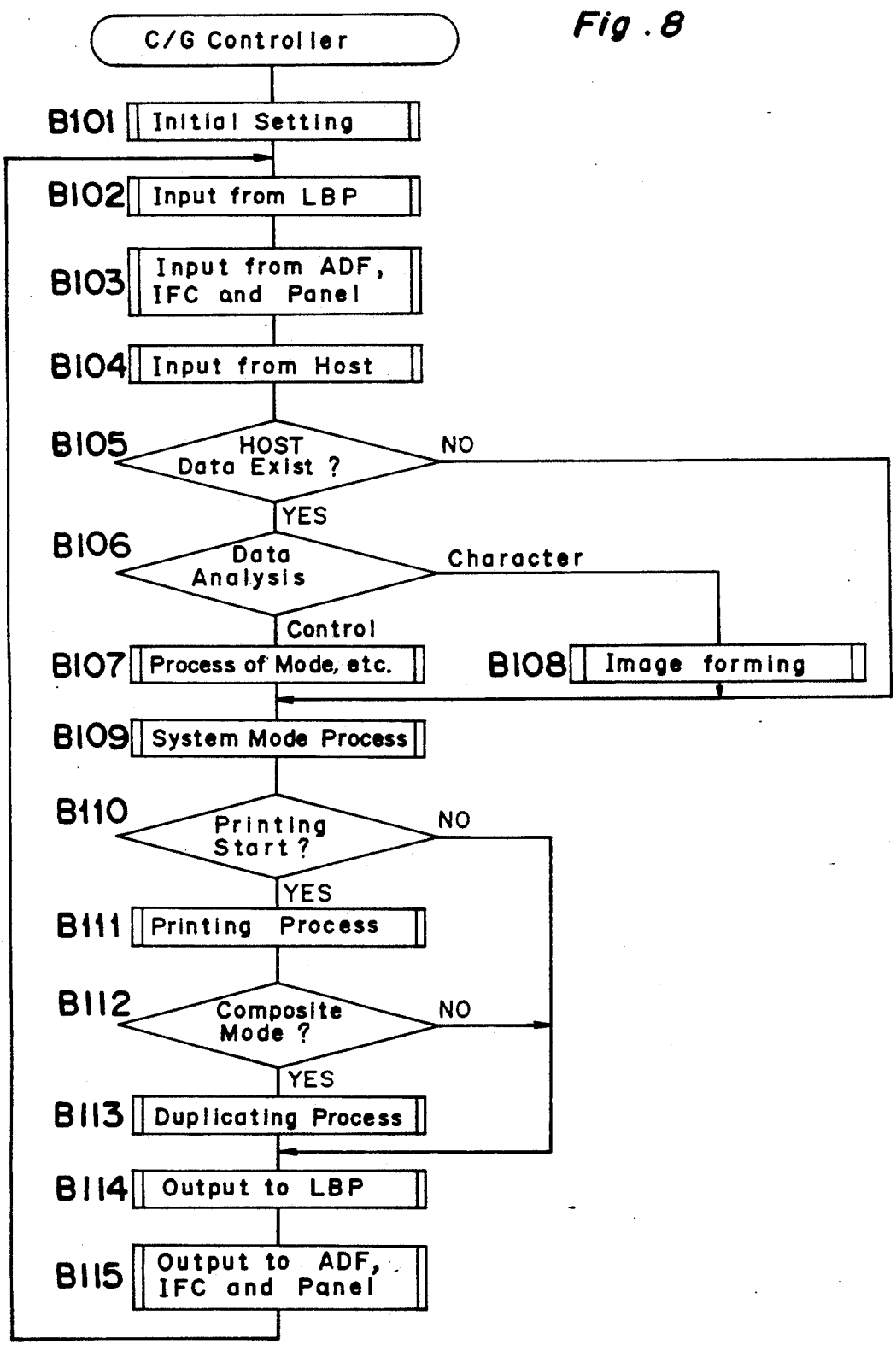
FIG. 8 is a flow chart showing a control process of a C/G controller.

(V-A 1) C/G Controller 10 (Refer to FIG. 8)

In the C/G controller 10, initial setting is carried out upon turning on the power (B101), and the status data of the compact laser printer (LBP) 800 is input (B102). Then the data from the control processors for controlling the automatic document feeder (ADF) 400, the interface controller (IFC) 20, and the operation panels 1100 and 1200 are input to the C/G controller 10 (B103). With the above operation, the controller 10 can judge the statuses of the laser printer 800 and the duplicator 200 as well as judge whether the laser printer 800 and the duplicator 200 are connected to the controller 10.

Subsequently, data is input to the C/G controller 10 from the host computer 100 (B104) and it is judged whether there is any data input from the host computer 100 (B105). When a data input exists, the input data is analyzed (B106). When the input data is a control data concerning the system control or the data concerning the duplication mode, the input data is subjected to a process (B107). When the input data is a character output data of the laser printer 800, an image forming process is carried out by the laser printer 800 (B108) and the control procedures of the entire complex machine are determined (B109).

Subsequently, it is checked whether there exists a print starting signal for starting the printing operation of the laser printer 800 (B110). When the print starting signal is input, the printing process is carried out by the laser printer 800 (B111), and it is judged whether or not the composite mode is selected (B112). When the composite mode is selected, the duplication process corresponding to the composite mode is executed (B113), thereafter the output data is transmitted to the laser printer 800, automatic document feeder 400 and to the interface controller 20 (B114 and B115). When no print starting signal is input or when the single mode is selected despite that the print starting signal is input, the corresponding data is applied to the laser printer 800 and the like units 400 and 20 (B114 and B115).

When the above-mentioned processes are completed, the output data of the laser printer 800 is applied to the C/G controller 10 (B102). When there exists a sheet transfer demand signal for supplying a sheet from the sheet supply unit 300 to the laser printer 800, the C/G controller 10 receives the sheet transfer demand signal to be adjusted therein so that the adjusted sheet transfer demand signal is transferred to the interface controller 20 at the time of demanding a signal to be applied to the interface controller 20 (B115).

Figure 9:
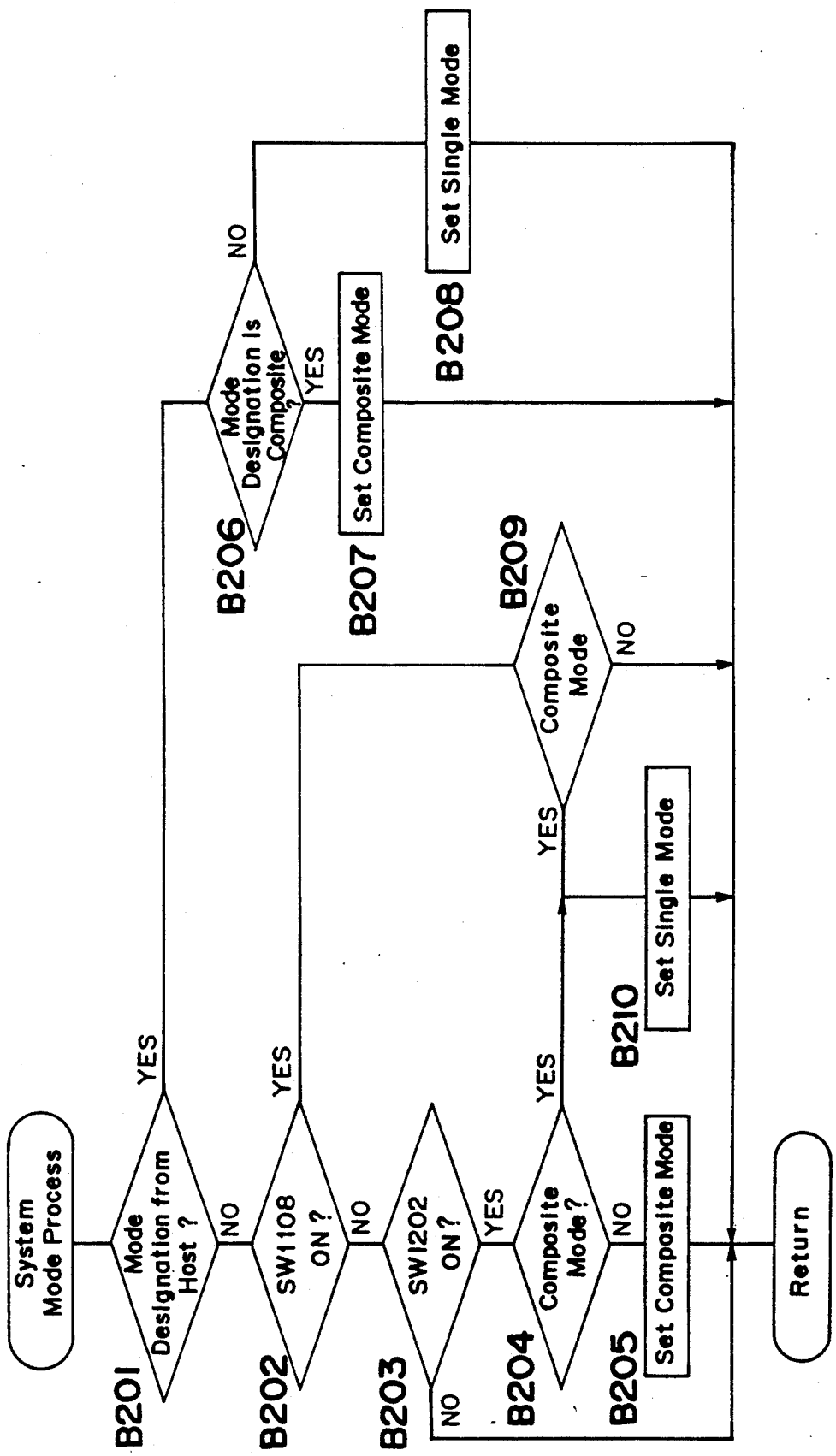
FIG. 9 is a flow chart of a system mode process in controlling the C/G controller.

(V-A-2) System Mode Process (Refer to FIG. 9)

In the system mode process of the C/G controller 10 (B109), it is judged whether there is generated a mode designation from the host computer 100 (B201) In other words, it is judged whether or not there is a designation of the composite mode or the single mode. When the mode designation is not generated from the host computer 100, then it is judged whether the mode selection switch 1108 of the operation panel 1100 provided in the duplicator 200 is pressed (B202). When the activation (on-state) signal of the mode selection switch 1108 of the operation panel 1100 is not input, it is then judged whether the mode selection switch 1202 of the laser printer 800 is pressed (B203). In more detail, whether any of the composite mode and the single mode is selected it is judged by giving the top priority to the signal transmitted from the host computer 100, giving the second priority to the signal transmitted from the selection switch 1108 of the duplicator operation panel 1100, and giving the third priority to the signal transmitted from the selection switch 1202 of the laser printer operation panel 1200.

When there exists a mode designation generated by any of the host computer 100, the duplicator operation panel 1100 and the laser printer operation panel 1200, it is judged whether the designated mode is the composite mode or the single mode (B204, B206, and B209), and the complex machine is set up to the designated mode (B205, B207, B208, and B210). Mode selection is carried out through the process as described above, and the signal corresponding to the designated mode is output to the control processors for controlling the laser printer 800, automatic document feeder 400, interface controller 20 and the operation panels 1100 and 1200.

Figure 10:
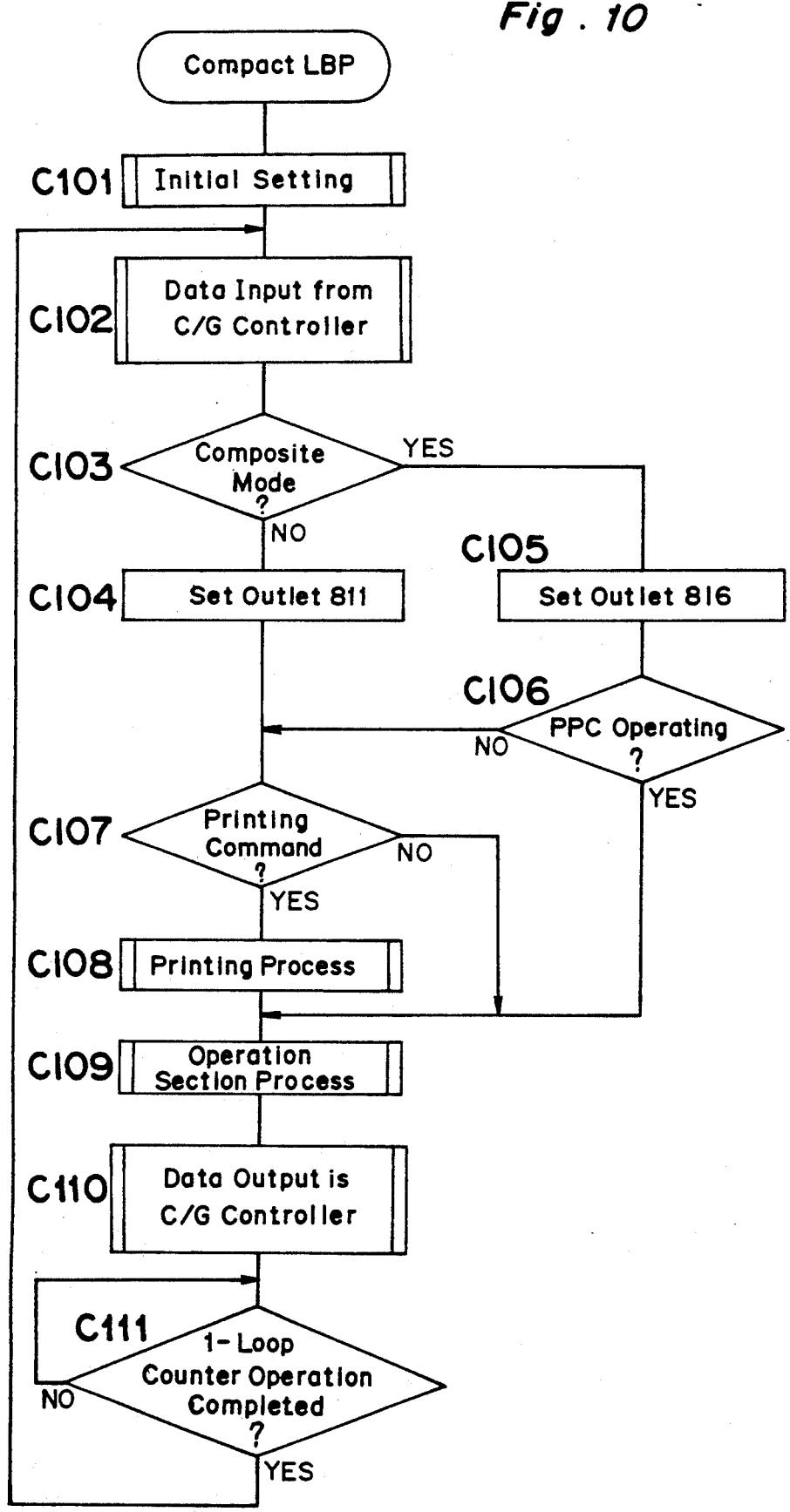
FIG. 10 is a flow chart of controlling the laser printer.

(V-B-1) Laser Printer (Refer to FIG. 10)

In the control processor for controlling the laser printer 800, after the control processor is initialized (C101), data is applied to the control processor from the C/G controller 10 (C102). The input data includes mainly the setting data for setting the printing mode and the like. Then it is judged whether the composite mode is selected (C103), and when the composite mode is not selected, the sheet diverter 817 provided between the image fixing unit 809 and the sheet ejecting roller 810 in the laser printer 800 is set so as to divert the sheet transferred through the image fixing unit 809 to be directed to the sheet outlet tray 811 (C104). When the composite mode is selected, the sheet diverter 817 is set so as to divert the sheet passing through the image fixing unit 809 upward to the original sheet transfer unit 900 (C105).

When the sheet diverter 817 is set so as to transfer the sheet to the outlet tray 811, the printing command is checked (C107). The signal to be checked is included in the data applied by the C/G controller 10 at the step (C102). When a printing command exists, a printing process is carried out by the laser printer 800 (C108), and a process at the operation section (described in detail after) is carried out (C109).

When the sheet diverter 817 is set so as to transfer the sheet to the original sheet transfer unit 900, it is judged whether the duplicator 200 is in operation (C106). When the duplicator 200 is not in operation, it is judged whether there is a printing command and the printing process is executed When the duplicator 200 is in operation, the system operation proceeds to the process of the operation section without executing any printing process (C109).

Subsequently, the condition signal, etc. of the laser printer 800 is applied to the C/G controller 10 (C110), and it is judged whether the 1-loop counter operation is completed (C111). When the counter operation is completed, the process at the step of (C102) is carried out again.

Figure 11:
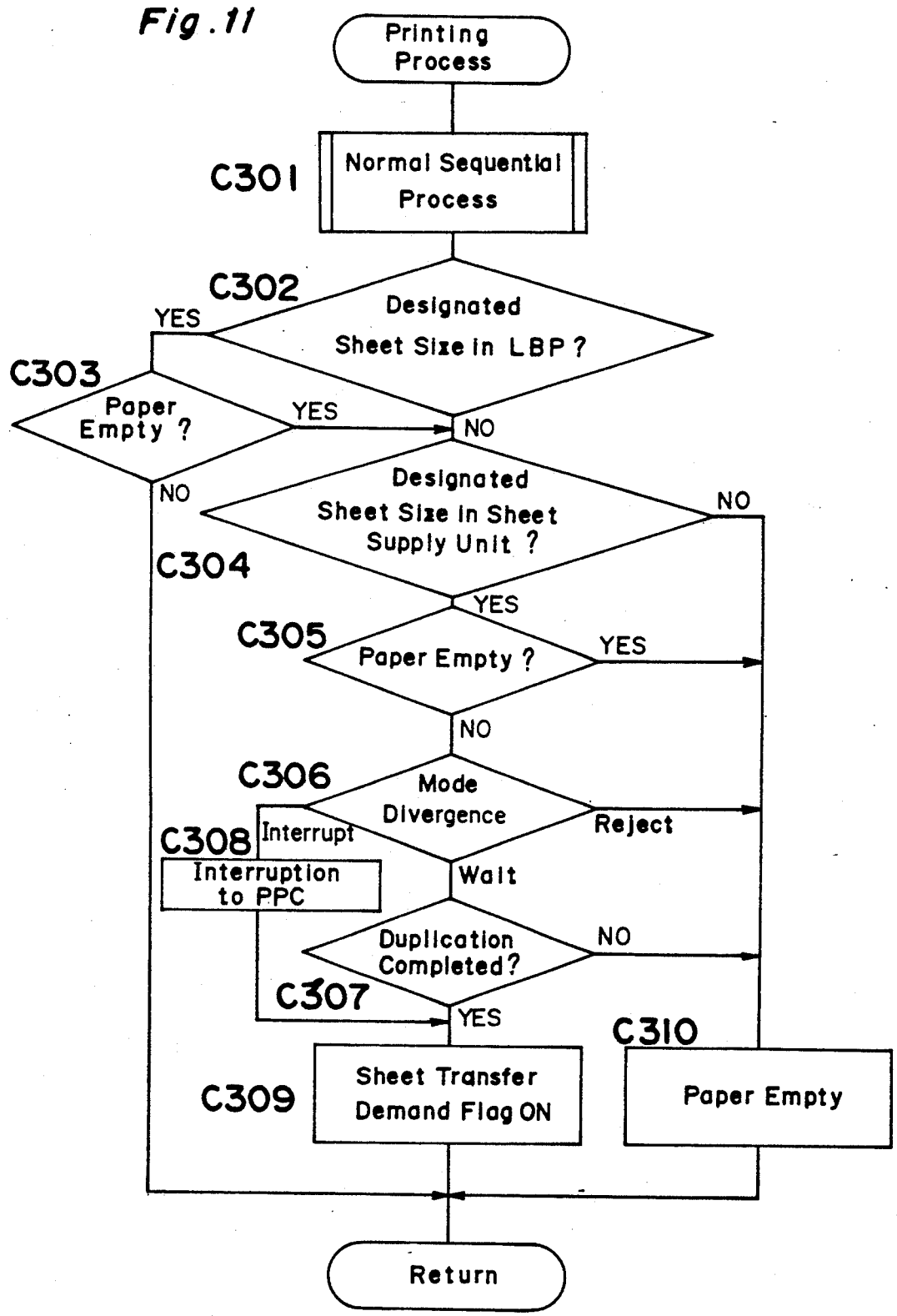
FIG. 11 is a flow chart of a printing process in controlling the laser printer.

(V-B-2) Printing Process (Refer to FIG. 11)

The printing process of the laser printer 800 (C108) includes mainly the sheet supply process and the process which is to be carried out when the interruption wait, or rejection mode is selected by operating the sheet transfer process mode selecting switch 1204 on the operation panel 1200 in the laser printer 800.

In the present subroutine, firstly a normal sequential process is carried out (C301). The sequential operation is a control operation for operating the photosensitive drum 801 and its peripheral units according to a prescribed sequence Then it is judged whether the size of the sheets stored in the sheet supply section 820 of the laser printer 800 coincides with the sheet size designated by the host computer 100 (C302). The above judgement is executed according to a signal transmitted from a sheet sensor (not shown) provided in the sheet supply section 820.

When the size of the sheets stored in the sheet supply section 820 coincides with the designated sheet size, it is judged whether there is any sheet (C303). The above judgment is executed by the sheet detecting sensor (not shown) provided in the sheet supply section 820. When no sheet exists, i.e., when in the empty condition, the subroutine returns to the main routine of the C/G controller 10.

When the size of the sheets stored in the sheet supply section 820 does not coincide with the designated sheet size, it is judged whether the size of the sheet stored in one of the sheet supply sections 301 through 304 of the sheet supply unit 300 coincides with the designated sheet size (C304). When no sheet of the designated size exists in any of the sheet supply sections 301 through 304, the paper empty condition is indicated at the indicator section in the duplicator operation panel 1100 (C303) to return to the main routine (C310) When any size of the sheets stored in the sheet supply sections 301 through 304 coincides with the designated sheet size, it is judged whether there is any sheet in the sheet supply sections (C305). When no sheet exists, indication of the paper empty condition is made (C310). When a sheet exists, after carrying out the following processes (C306 through C309), the sheet transfer demand flag is turned on to supply the sheet from the sheet supply section storing the sheet of the designated size (C309).

When a sheet of the designated size exists in any of the sheet supply sections 301 through 304 of the sheet supply unit 300, it is judged on the operation panel 1200 whether any of the interruption, wait and rejection mode is selected by the sheet transfer mode selecting switch 1204 (C306).

In the interruption mode, the process in the currently set up mode (composite mode or single mode) is temporarily interrupted and the process is proceeded to the newly selected mode.

In the wait mode, the process is proceeded to the newly selected mode after completing the process in the mode currently set.

In the rejection mode, the newly selected mode is rejected so as to maintain the process in the mode currently set. Moreover, in the rejection mode, after the process in the currently set mode is completed, the mode can be changed to a new mode by selecting the new mode to be proceeded.

When it is judged that the wait mode is selected, it is checked whether the duplicating process of the duplicator 200 is completed (C307). When the duplicating process is not completed, the paper empty condition is indicated at the indicator section, and the sheet transfer demand flag is turned on simultaneously with completion of the duplicating process. When the interruption mode is selected, interruption is effected immediately on the operation of the duplicator 200 (C308), and the sheet transfer demand flag is turned on. When the rejection mode is selected, indication of the paper empty condition is made without regard to the condition of the duplicator 200 (C310).

Figure 12:
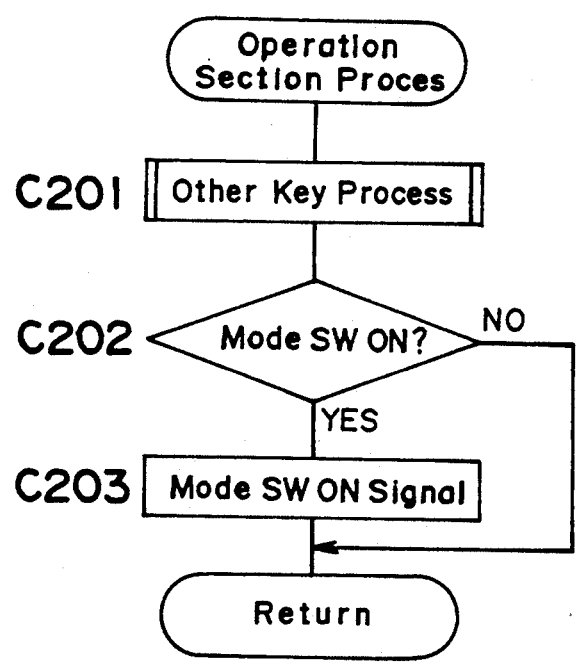
FIG. 12 is a flow chart of the operation section process in controlling the laser printer.

(V-B-3) Process at Operation Section (Refer to FIG. 12)

In the process of the above-mentioned operation section (C109), process of other keys is carried out, i.e., it is judged whether any of the interruption, wait, and rejection modes is selected by operating the sheet transfer mode selecting switch 109 (C201). Then it is judged whether the mode selecting switch 1202 is turned on (C202). When the mode selecting switch is turned on, the corresponding signal is set up (C203). When the mode selecting switch is not turned on, the current routine operation returns. The signal representing that the mode selecting switch 1202 is turned on is applied to the C/G controller 10 at the step (C110), and the C/G controller 10 judges whether the switch-on signal represents the composite mode or the single mode.

Figure 13:
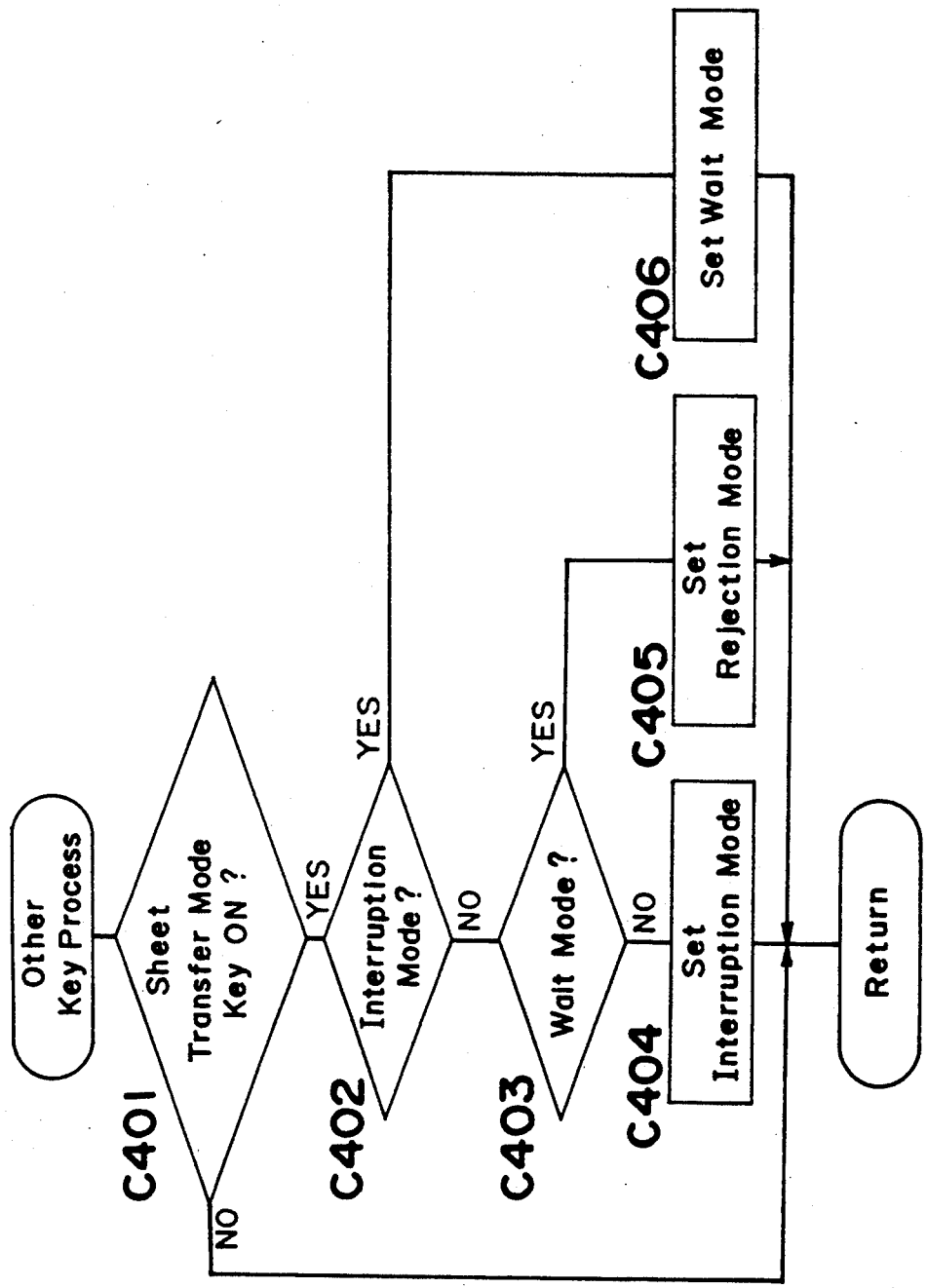
FIG. 13 is a flow chart of a process of other keys in controlling the laser printer.

(V-B-4) Process of Other Keys (Refer to FIG. 13)

In the process of other keys (C201), it is judged whether the sheet transfer mode selecting switch 1204 provided on the operation panel 1200 in the laser printer 800 is turned on (C401), wherein when the sheet transfer mode selecting switch 1204 is operated, mode selection is carried out in the order of the interruption mode, wait mode, rejection mode, and interruption mode.

Therefore, when the sheet transfer mode selecting switch 1204 is operated, it is judged whether the interruption mode or the wait mode is currently selected (C402 and C403). When the mode currently selected is the rejection mode, wait mode, or interruption mode, respectively the interruption mode, rejection mode, and wait mode are set up (C404, C405, and C406).

Figure 14:
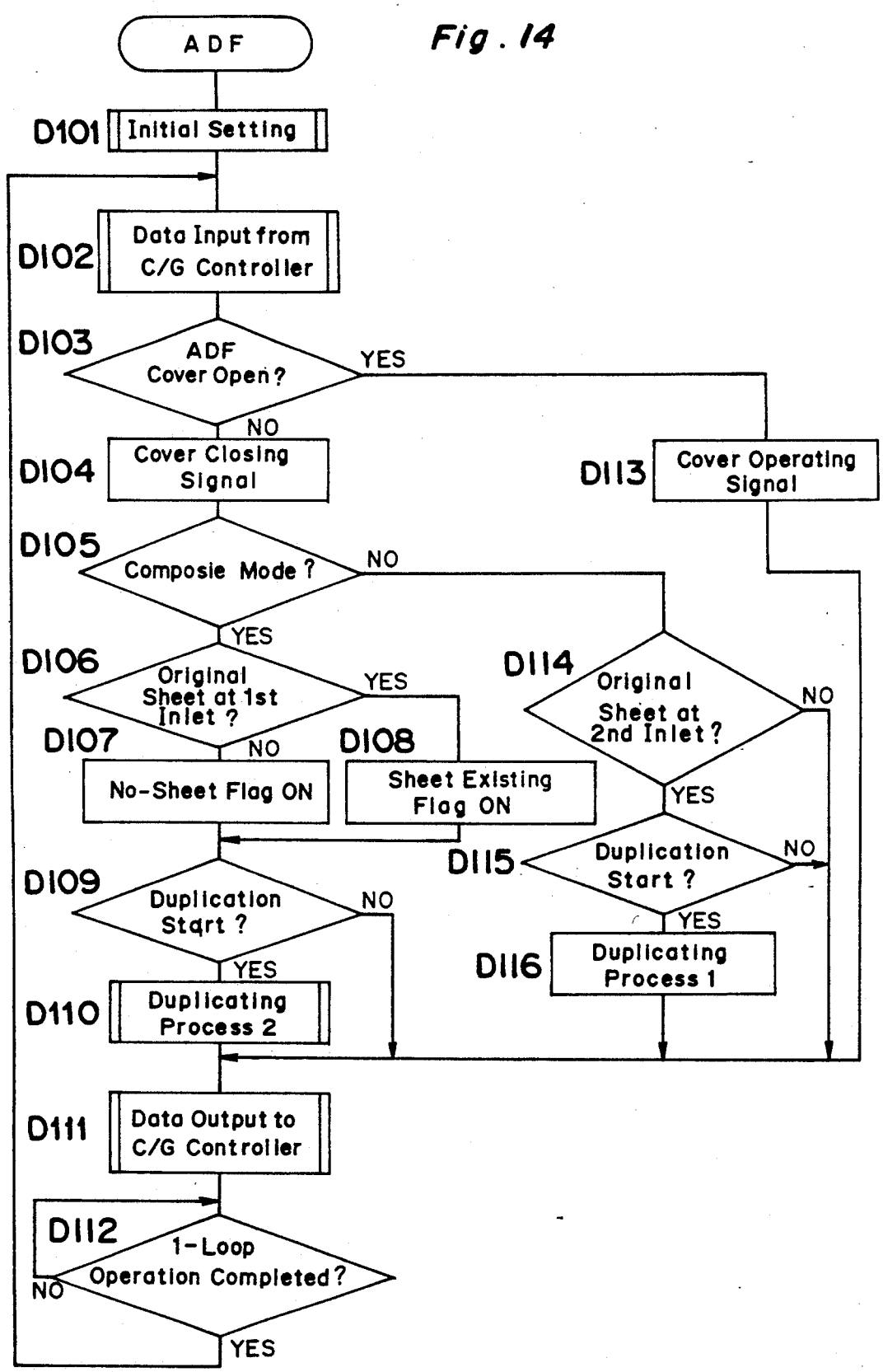
FIG. 14 is a flow chart of controlling the automatic document feeder.

(V-C) Automatic Document Feeder (ADF) (Refer to FIG. 14)

In the control processor for controlling the automatic document feeder 400, after initial setting thereof (D101), data is applied to the control processor from the C/G controller 10 (D102). The currently input data includes the mode data of such as the composition mode or the single mode, and some of the data is set upon receiving a command from the host computer 100, while some other data are set up by operating the keys on the operation panel.

Then it is judged whether the automatic document feeder 400 is opened to the duplicator 200 (D103). When the automatic document feeder 400 is opened to the duplicator 200, a cover opening signal is formed to interrupt the process of the automatic document feeder 400 despite the selected mode (D113), and the cover opening signal is applied to the C/G controller 10 (D111). When the automatic document feeder 400 is closed to the duplicator 200, a cover closing signal is formed (D104), and thereafter it is judged whether the composite mode is selected (D105). Then the process diverts according to the judgment result of the step (D105).

When the composite mode is not selected, i.e., when the single mode is selected, it is judged whether any original sheet is set in the original tray 409 (second original inlet) (D114). The above judgment is executed according to the signal transmitted from the sheet detecting sensor (not shown). When no original sheet exists, the data representing the absence of the sheet is applied to the C/G controller 10 (D111). When an original sheet exists, it is judged whether there is a duplication starting signal (D115). When the duplication starting signal is input, the duplicating process 1 is carried out (D116). In the duplicating process 1, the original sheet is transferred in the designated mode. If necessary, the original is reversed according to the duplication mode such as the dual-surface duplication mode or the compound duplication mode, or the next original sheet is transferred.

When the composite mode is selected, it is judged whether there is any original sheet in the path 410 of the automatic document feeder 400 according to the output signal from the sensor 412 (D106). When an original sheet exists, a sheet existing flag is set up (D108). When no original sheet exists, a no-sheet flag is set up (D107).

Subsequently, it is judged whether there is a duplication starting signal (D109). When the duplication starting signal exists, the duplicating process 2 is carried out (D110). In the duplicating process 2, the original sheet is guided to the original sheet glass table 209 at the sheet transfer speed V2 of the laser printer 800.

Then such data as the above-mentioned sheet existing flag and the sheet absent flag are applied to the C/G controller 10 (D111), and after the 1-loop counter operation is completed, the process of (D102) is carried out again.

When the composite mode is selected and original sheets are successively supplied to the automatic document feeder 400 from the laser printer 800, the signals of the sheet existing flag or the sheet absent flag are set up according to the signal from the sensor 412, and the signals of the flag are successively applied to the C/G controller 10. In the meantime, the original sheets transferred to the automatic document feeder 400 are successively transferred onto the original sheet glass table 209, while the succeeding original sheets supplied from the laser printer 800 are transferred to the automatic document feeder 400 through the original sheet transfer unit 900.

Figure 15:
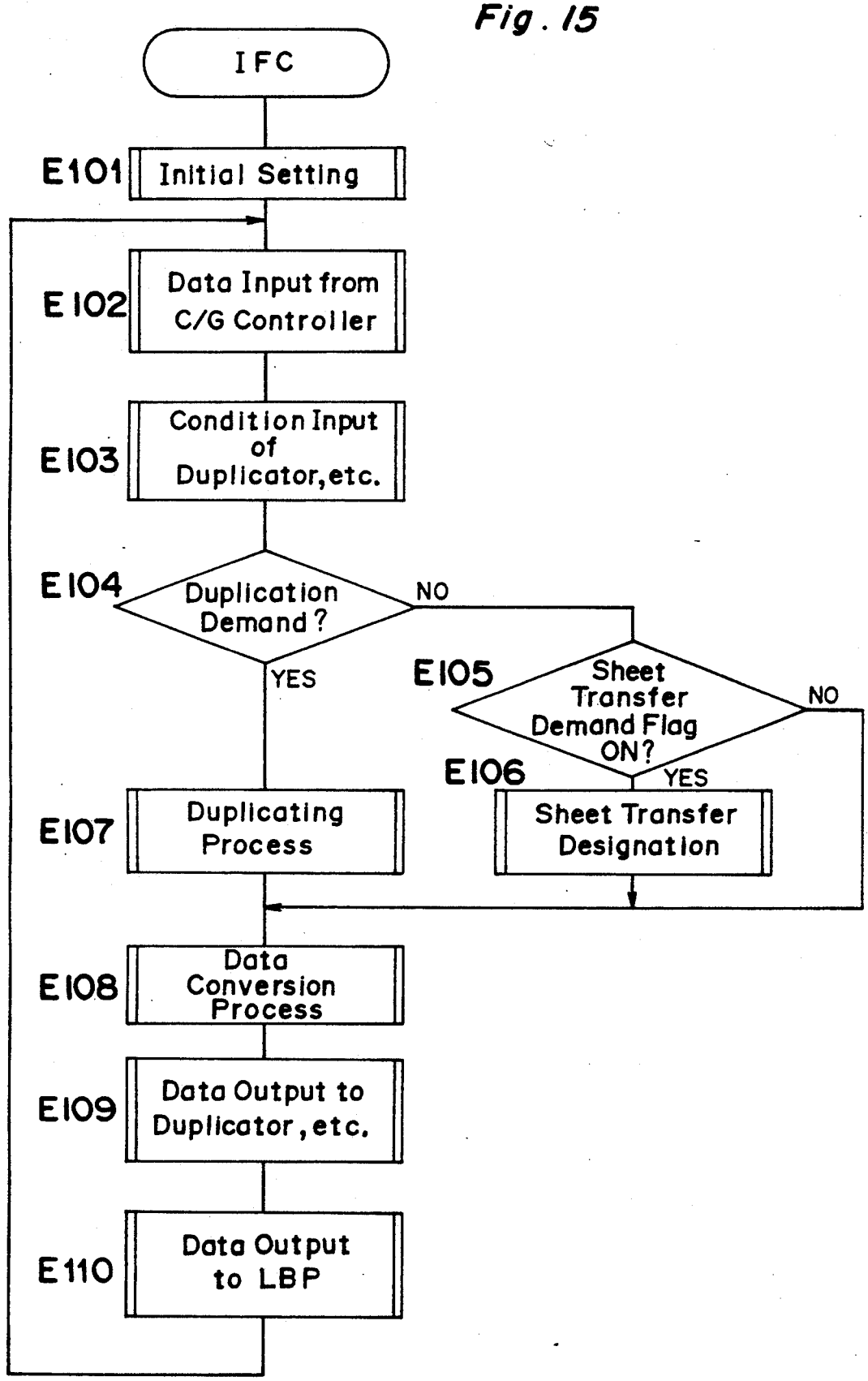
FIG. 15 is a flow chart of controlling the interface controller.

(V-D) Interface Controller (IFC) (Refer to FIG. 15)

In the control processor for controlling the interface controller (IFC) 20, after initial setting of the control processor (E101), the necessary data mainly including the operation mode of the duplicator 200 is applied thereto from the controller 10 (E102). Then the condition signals representing the conditions of the duplicator 200, sheet supply unit 300, sheet reversing unit 500, and sorter 600 are applied to the control processor therefrom (E103). In other words, the signals representing that no sheet exists, the front door is open, or the other conditions are applied. Then it is judged whether there is a duplication demand (E104). When the duplication demand exists, the duplicating process is carried out (E107). When no duplication demand exists, it is judged whether the sheet transfer demand flag is set up (E105). When the sheet transfer demand flag is set, the designated sheet transfer process is carried out to supply the sheets from the sheet supply unit 300 to the laser printer 800 (E106).

After carrying out a data conversion process (E108), the signals input in the duplicating process and the timing signals from the optional units of the duplicator 200, sheet transfer unit 300, and sorter 600 are applied to the optional units and the C/G controller 10 (E109 and E110). In other words, the interface controller 20 manages the activation and timing of the optional units such as the duplicator 200 and sheet transfer unit 500 as well as the information concerning sheet transfer and successively sends the same back to the C/G controller 10.

Figure 16:
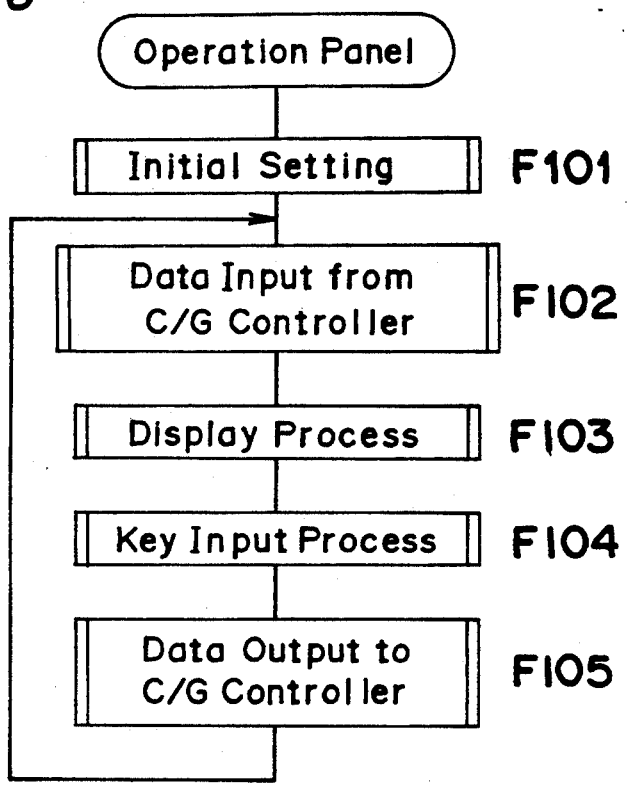
FIG. 16 is a flow chart of controlling the operation panel.

(V-E 1) Duplicator Operation Panel (Refer to FIG. 16)

In the control processor of the duplicator operation panel 1100, after initial setting of the processor (F101), the necessary data are supplied from the C/G controller 10 (F102), and the contents corresponding to the data are displayed on each of the display sections in the operation panel 1100 (F103). In the above sections, the contents to be displayed include such duplication modes as the dual-surface duplication, compound duplication, and single-surface duplication. Then an input operation is executed through key operations on the operation panel 1100 (F104). For example, a signal representing mode change from the dual-surface duplication mode to the compound duplication mode is to be input. Then the contents of the input signal are applied to the C/G controller 10 (F105).

Figure 17:
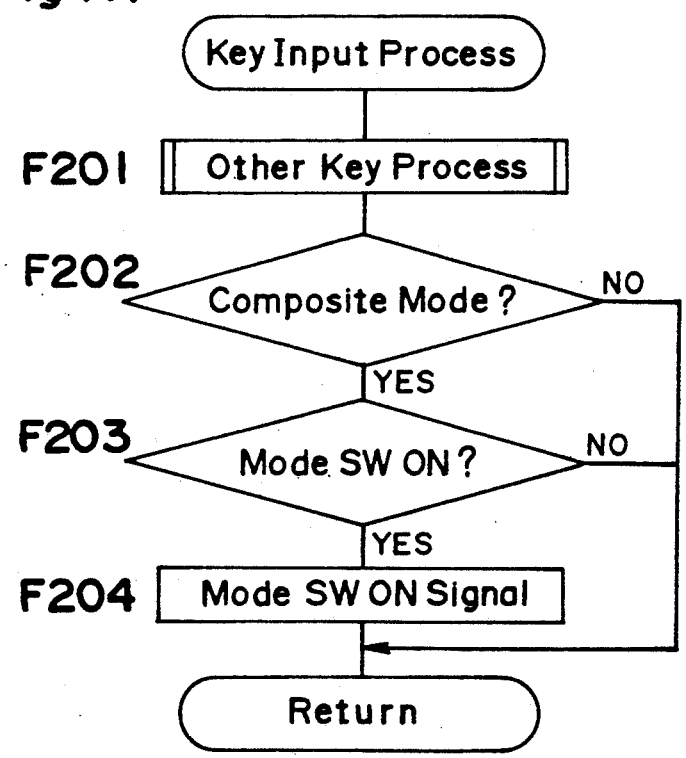
FIG. 17 is a flow chart of a key input process in controlling the operation panel.

(V-E-2) Key Input Process (Refer to FIG. 17)

Referring to the above-mentioned key input process (F104), after carrying out the process of operating the other keys, it is judged whether the composite mode is selected (F202). When the composite mode is not selected, the current routine operation returns. When the composite mode is selected, it is judged whether the mode selecting switch 1108 is operated (F203). When the switch is pressed on, a mode signal switch-on signal is produced (F204). The mode selecting switch-on signal is transmitted to the C/G controller 10 at the step (F105).

The reason why the switch-on signal of the mode selecting switch 1108 is subject to judgment only when the composite mode is selected is because the image signal applied to the laser printer 800 is basically generated by the host computer 100. Since the image signal is never transmitted from the duplicator 200, it is meaningless that the composite mode is selected in the duplicator 200. Therefore, the mode selecting switch 1108 on the operation panel 1100 of the duplicator 200 is effectively operated only when the selected composite mode is to be canceled.

Figure 18:
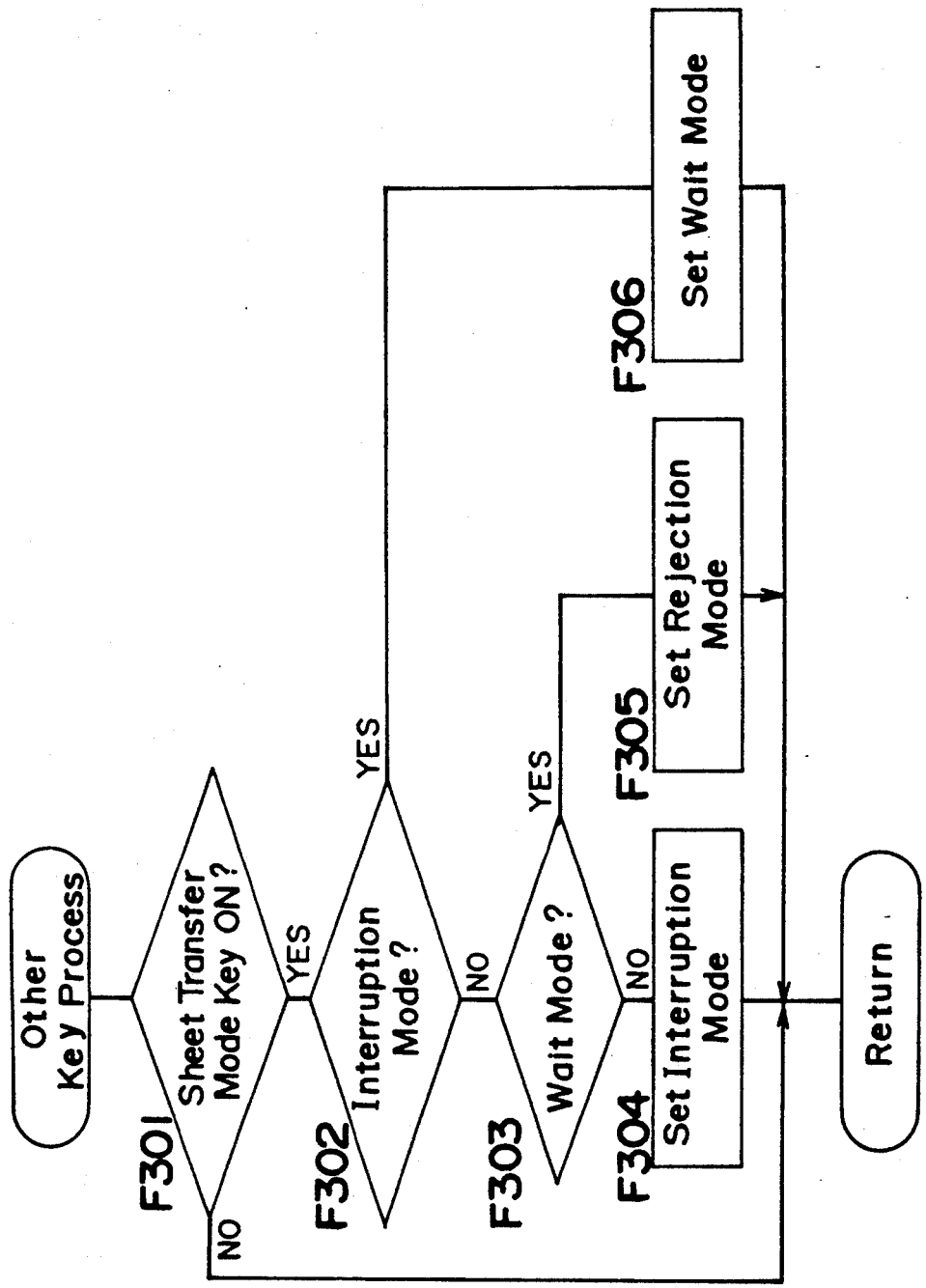
FIG. 18 is a flow chart of a process of other keys in controlling the operation panel.

(V-E-3) Process of other Keys (Refer to FIG. 18)

Referring to the process of operating the other keys (F201), it is judged whether the sheet transfer mode selecting switch 1109 provided on the operation panel 1100 of the duplicator 200 is pressed on (F301). When the sheet transfer mode selecting switch 1109 is pressed on, selection of modes is carried out in the order of the interruption mode, wait mode, rejection mode, and interruption mode, and so on.

Therefore, when the sheet transfer mode selecting switch 1109 is switched on, it is judged whether the interruption mode is currently selected or the wait mode is selected (F302 and F303). When the mode currently selected is the rejection mode, wait mode, or interruption mode, respectively the interruption mode, rejection mode, or wait mode is set up (F304, F305, and F306).

Figure 19:
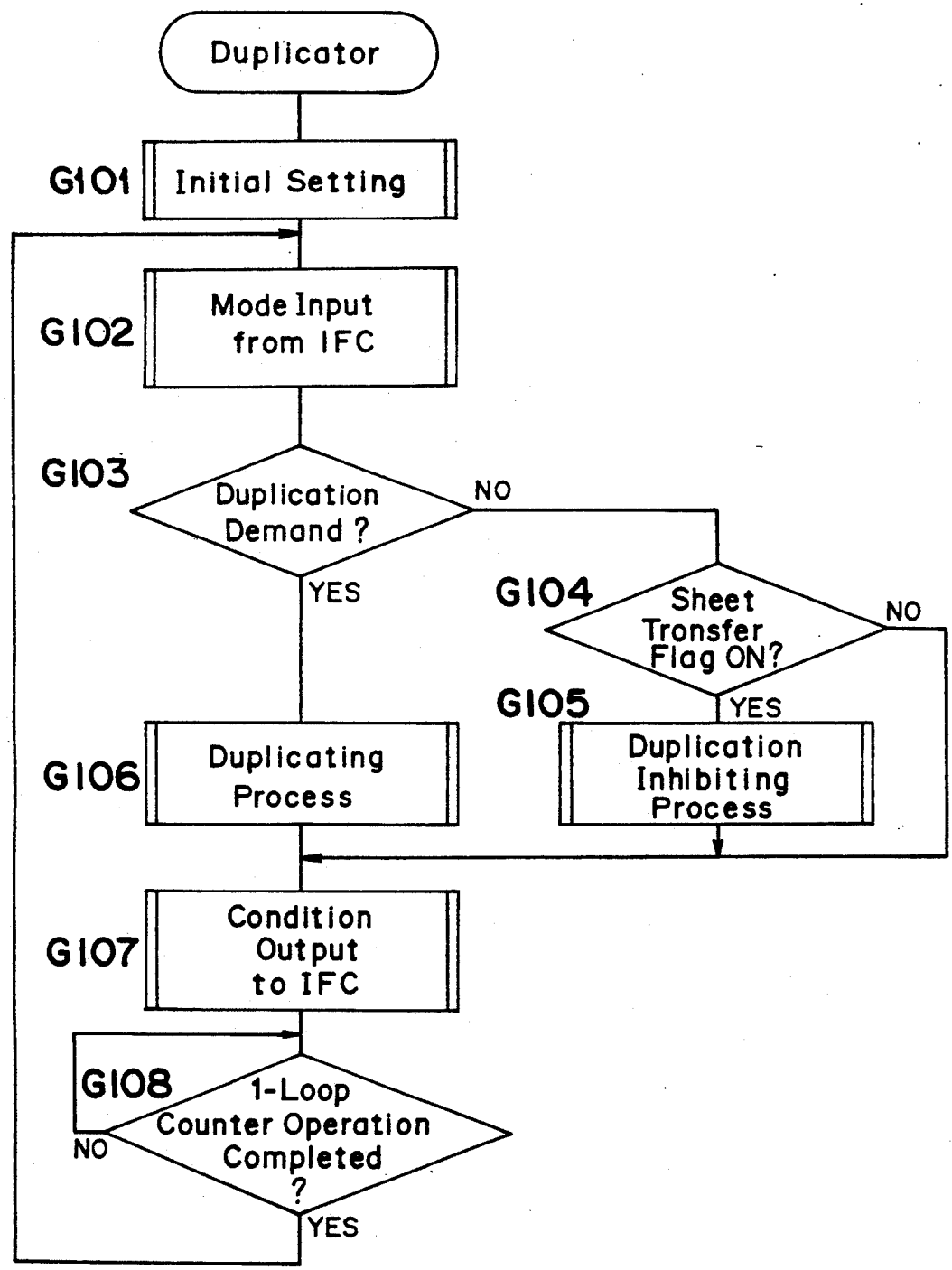
FIG. 19 is a flow chart of controlling the duplicator.

(V-F) Duplicator (Refer to FIG. 19)

The control processor for controlling the duplicator 200 is operated according to the mode command transmitted from the interface controller 20. Firstly, after initial setting of the control processor (G101), the duplication mode is transmitted from the interface controller 20 and applied to the control processor (G102). Then it is judged whether there is a duplication demand of the duplication mode (G103). When the duplication demand exists, the duplicating process is carried out (G106) and the condition signal thereof is transmitted to the interface controller 20 (G107). When no duplication demand exists, it is judged whether the sheet transfer demand flag is set up (G104). When the sheet transfer demand flag is set up, a duplication inhibiting process is carried out (G105). When the sheet transfer flag is not set up, the condition signal is applied to the interface controller 20 as it is (G107). Then it is judged whether the 1-loop counter operation is completed (G108). When the counter operation is completed, the current routine operation returns to the process of (G102).

Figure 20:
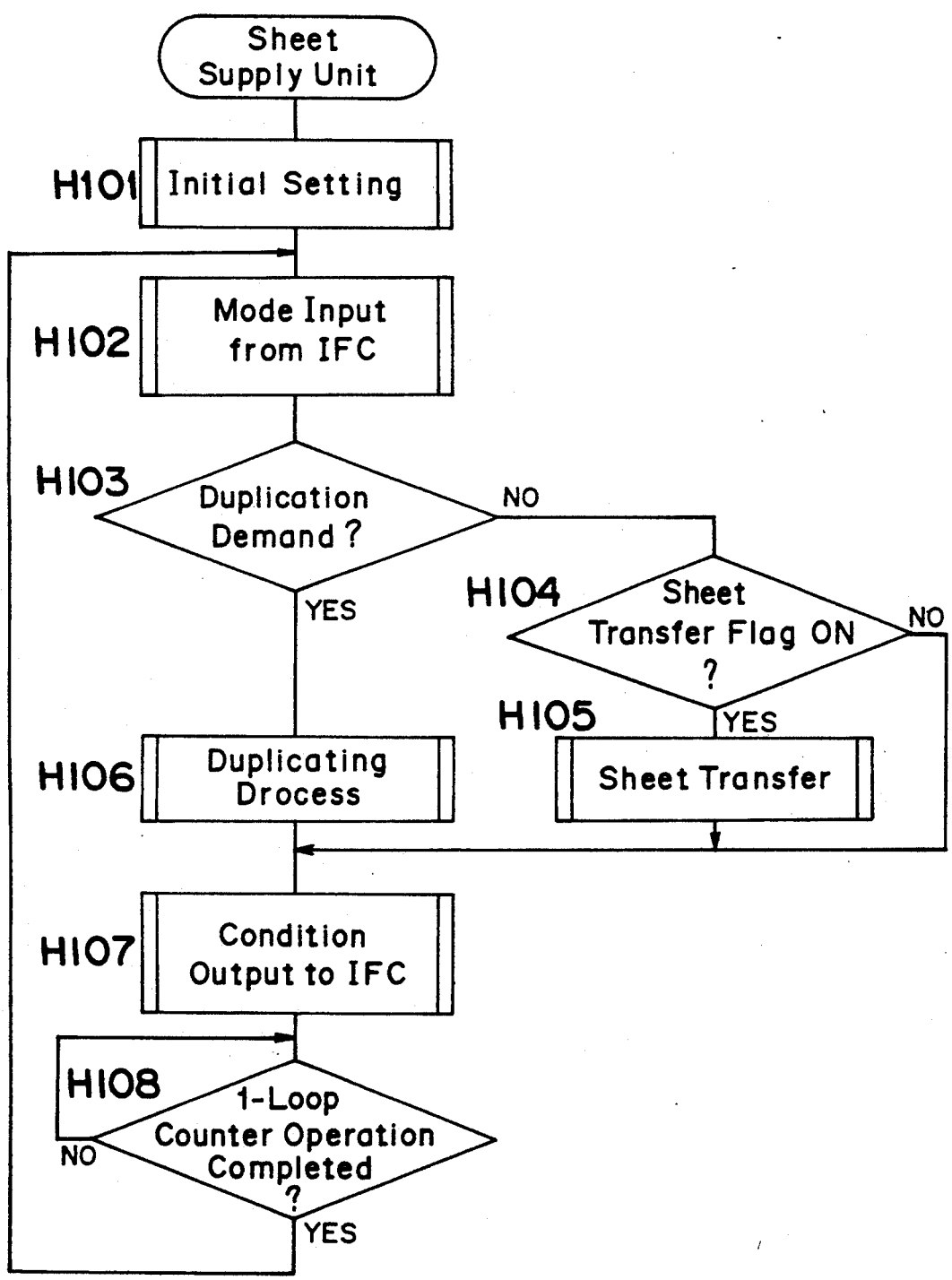
FIG. 20 is a flow chart of controlling the sheet supply unit.

(V-G) Sheet Supply Unit (Refer to FIG. 20)

The control processor for controlling the sheet supply unit 300 is operated according to the mode command transmitted from the interface controller 20. Firstly, after initial setting of the control processor (H101), a duplication mode transmitted from the interface controller and applied to the control processor (H102). Then it is judged whether there is a duplication demand of the duplication mode (H103). When the duplication demand exists, the duplicating process is carried out (H106) and the condition signal thereof is transmitted to the interface controller 20 (H107). When no duplication demand exists, it is judged whether the sheet transfer demand flag is set up (H104). When the sheet transfer demand flag is set, the sheet from the prescribed one of the sheet supply sections 301 through 304 is fed to the path 310 (H105) When the sheet transfer flag is not set up, the condition signal is applied to the interface controller 20 as it is (H107). Subsequently, it is judged whether the 1-loop counter operation is completed (H108). When the counter operation is completed, the current routine operation returns to the process of (H102).

Figure 21:
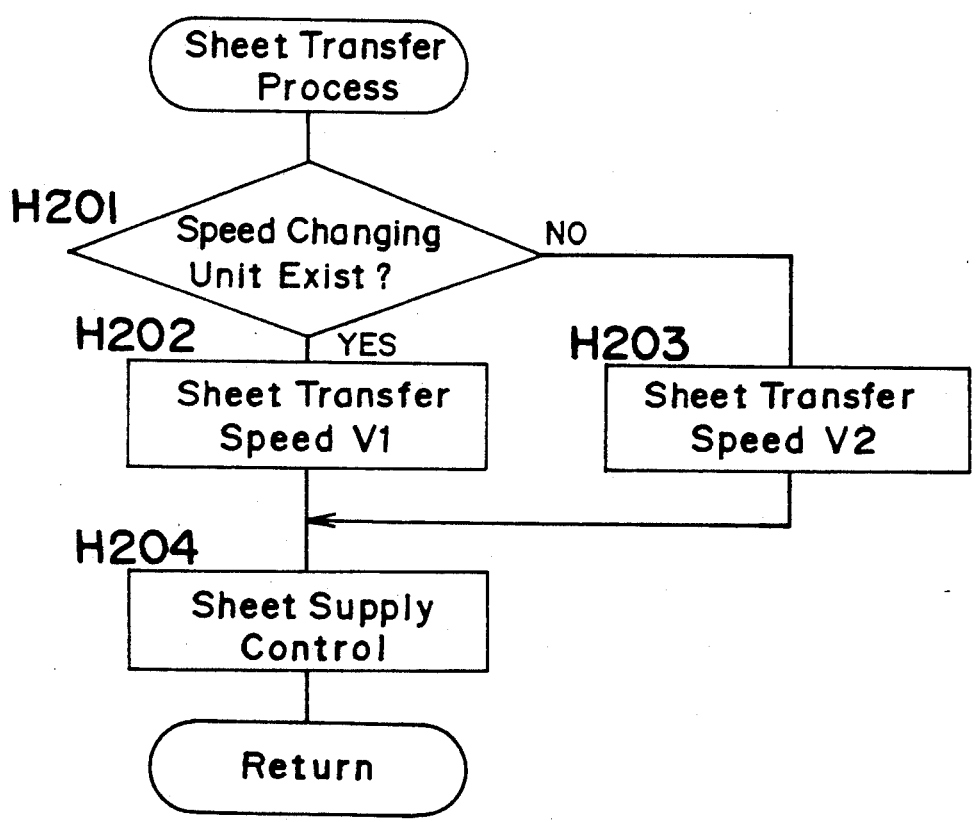
FIG. 21 is a flow chart of a sheet transfer process in controlling the controller.

Referring to the above process (H105), as shown in FIG. 21, firstly it is judged whether the speed changing unit 700 is connected to the C/G controller 10 (H201) When the speed changing unit 700 is connected to the C/G controller 10, the sheet transfer speed V1 corresponding to the duplicating process of the duplicator 200 is set up (H202). When the speed changing unit 700 is not connected, the sheet transfer speed V2 corresponding to the printing speed of the laser printer 800 is set up (H203). According to the set-up sheet transfer speed V1 or V2, the sheet is supplied to the path 310 under control (H204).

Figure 22:
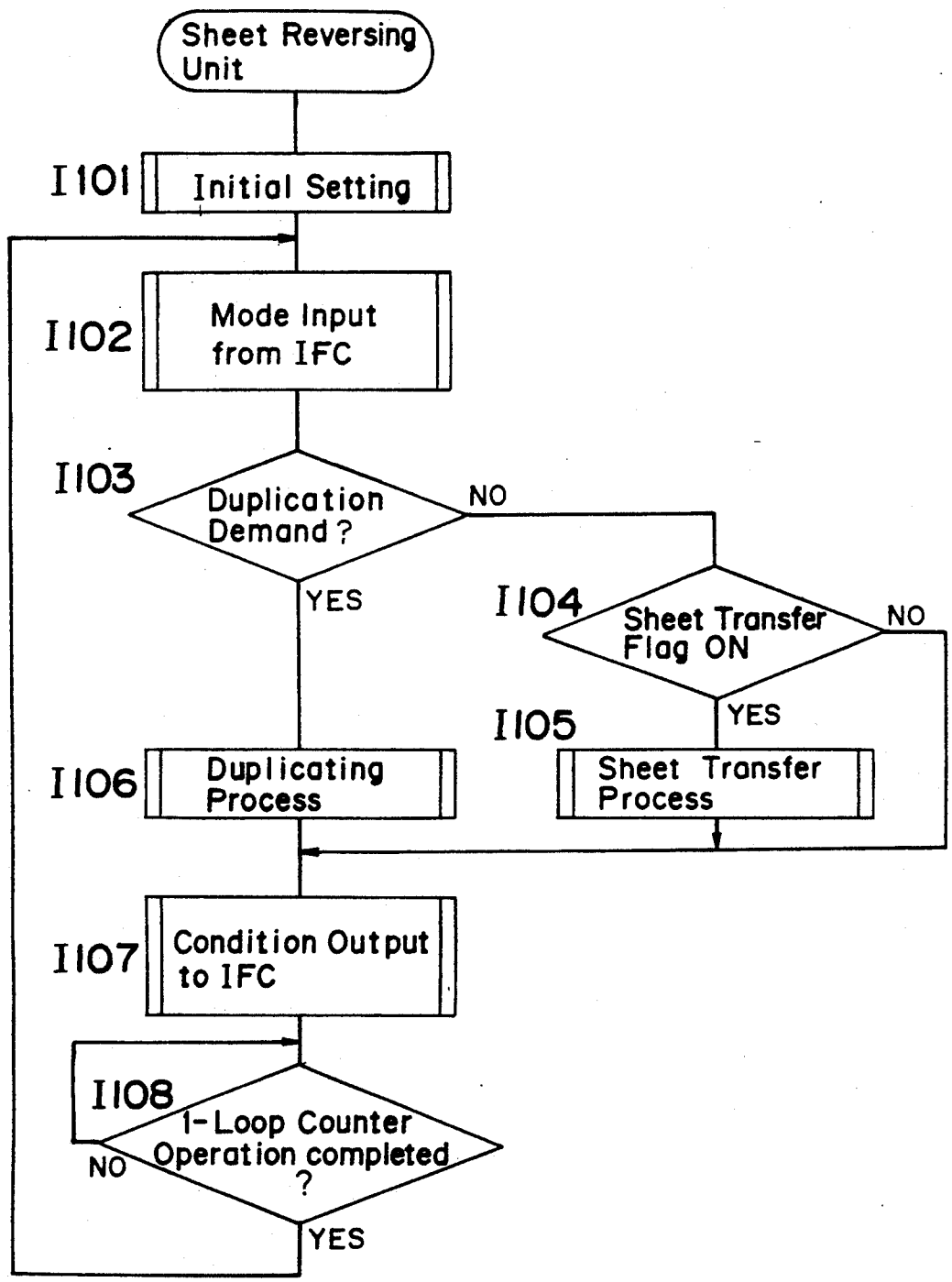
FIG. 22 is a flow chart of controlling the sheet reversing unit.

(V-H) Sheet Reversing Unit (Refer to FIG. 22)

The control processor for controlling the sheet reversing unit 500 is operated according to the mode command transmitted from the interface controller 20. Firstly, after initial setting of the control processor (I101), a duplication mode is transmitted from the interface controller 20 and applied to the control processor (I102). Then it is judged whether there is a duplication demand of the duplication mode (I103). When the duplication demand exists, the duplicating process is carried out (I106) and the condition signal thereof is transmitted to the interface controller 20 (I107). When no duplication demand exists, it is judged whether the sheet transfer demand flag is set up (I104). When the sheet transfer demand flag is set up, the sheet transfer process as to be described after is carried out (I105). When the sheet transfer demand flag is not set up, the condition signal is applied to the interface controller 20 as it is (I107). Subsequently, it is judged whether the 1-loop counter operation is completed (I108). When the counter operation is completed, the current routine operation returns to the process of (I102).

Figure 23:
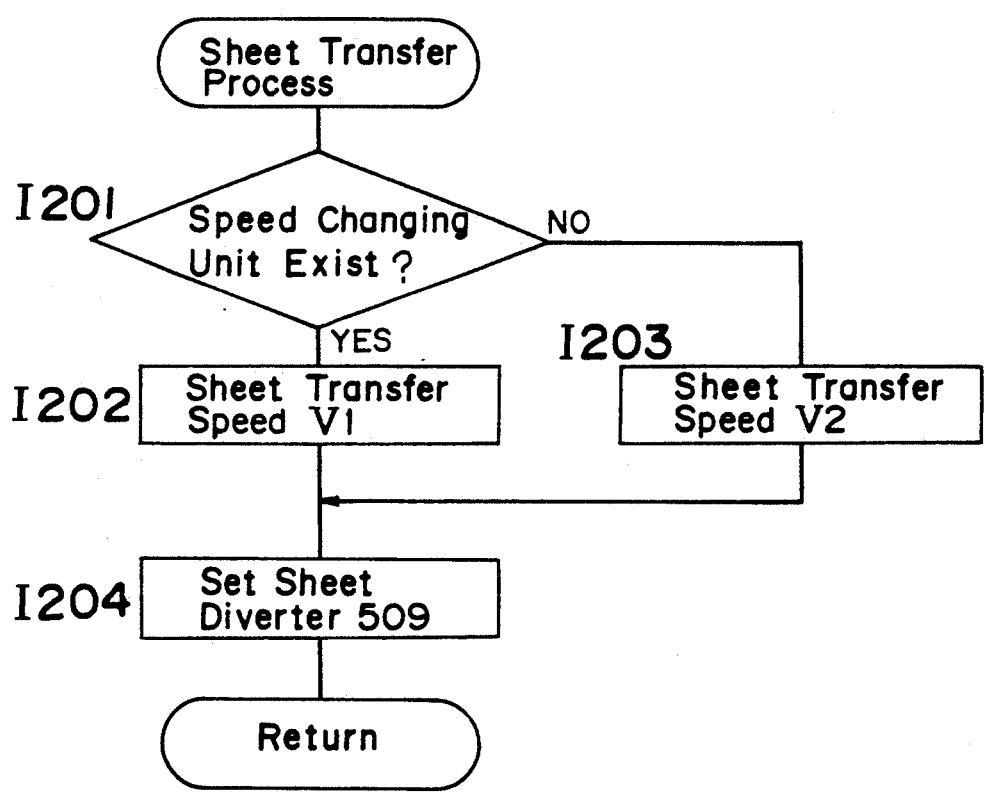
FIG. 23 is a flow chart of a sheet transfer process in controlling the sheet reversing unit.

Referring to the above sheet transfer process (I105), as shown in FIG. 23, it is judged whether the speed changing unit 700 is connected to the C/G controller 10 (I201). When the speed changing unit 700 is connected to the C/G controller 10, the sheet transfer speed V1 corresponding to the duplicating process of the duplicator 200 is set up (I202). When the speed changing unit 700 is not connected, the sheet transfer speed V2 corresponding to the printing speed of the laser printer 800 is set up (I203), and the sheet diverter 509 is set in such a manner that the sheet is transferred from the path 505 to the sorter 600 via the path 508 (I204).

Figure 24:
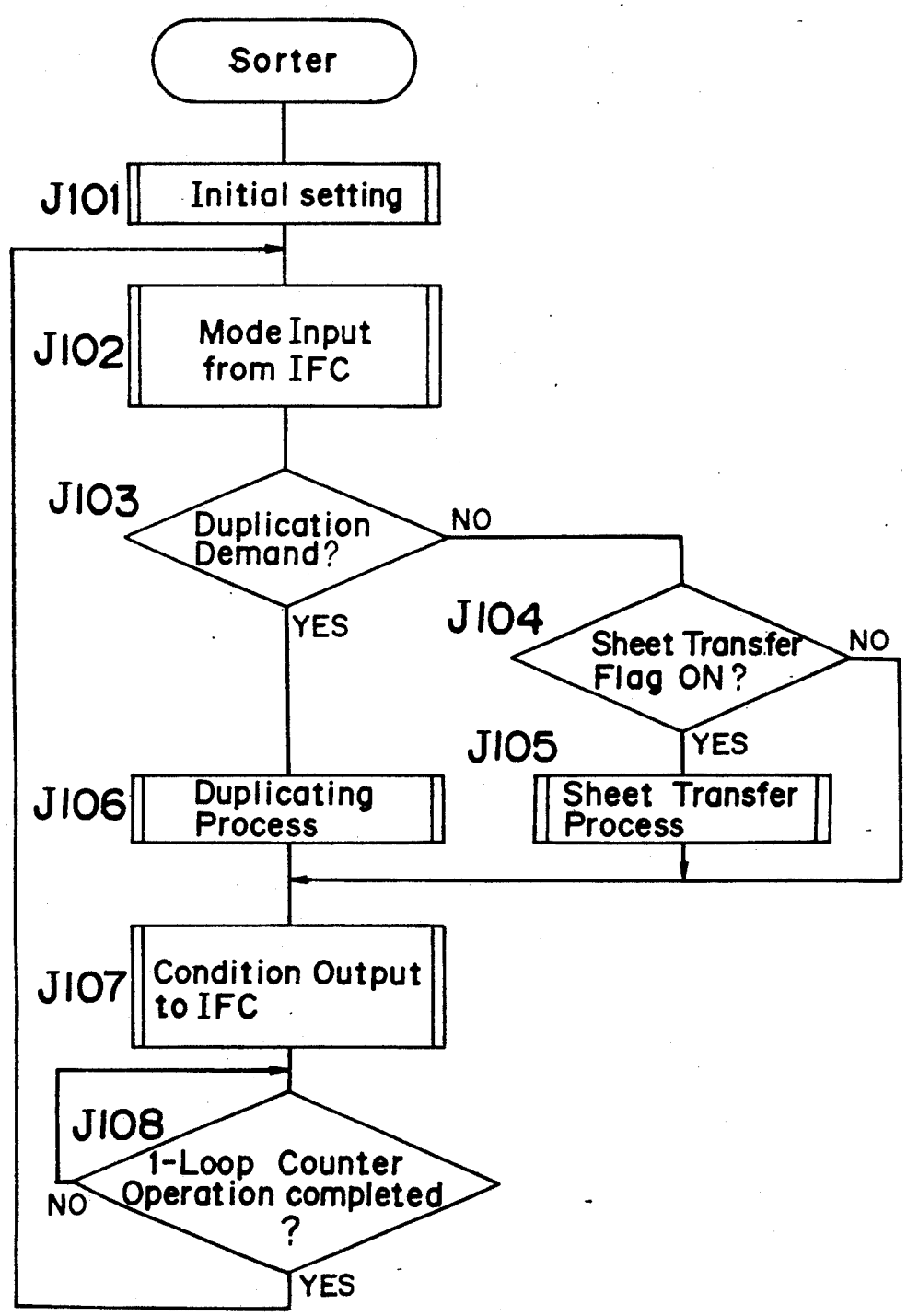
FIG. 24 is a flow chart of controlling the sorter.

(V-I) Sorter (Refer to FIG. 24)

The control processor for controlling the sorter 600 is operated according to the mode command transmitted from the interface controller 20. Firstly, after initial setting of the control processor (J101), a duplication mode is transmitted from the interface controller 20 and applied to the control processor (J102). Then it is judged whether there is a duplication demand of the duplication mode (J103). When a duplication demand exists, the duplicating process is carried out (J106) and the condition signal is transmitted to the interface controller 20 (J107). When no duplication demand exists, it is judged whether the sheet transfer demand flag is set up (J104). When the sheet transfer demand flag is set up, a sheet transfer process as to be described later is carried out (J105). When the sheet transfer demand flag is not set up, the condition signal is applied to the interface controller 20 as it is (J107). Subsequently, it is judged whether the 1-loop counter operation is completed (J108). When the counter operation is completed, the current routine operation returns to the process of (J102).

Figure 25:
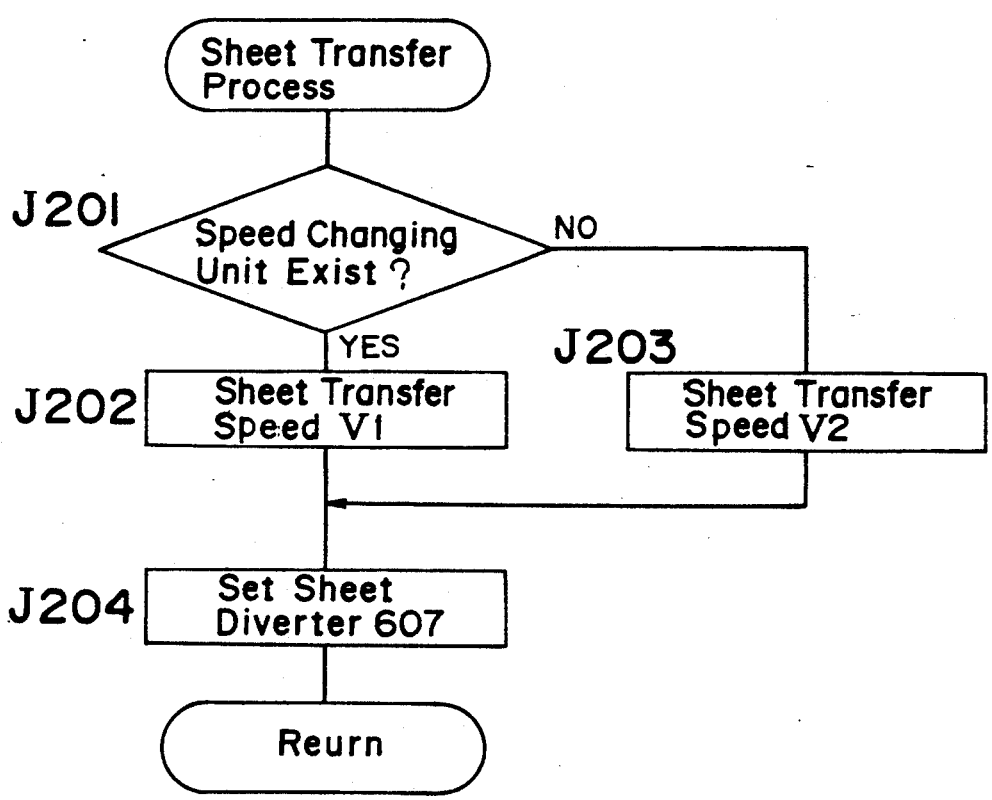
FIG. 25 is a flow chart of a sheet transfer process in controlling the sorter.

Referring to the above sheet transfer process (J105), as shown in FIG. 25, it is judged whether the speed changing unit 700 is connected to the C/G controller 10 (J201). When the speed changing unit 700 is connected to the C/G controller 10, the sheet transfer speed V1 corresponding to the duplicating process of the duplicator 200 is set up (J202). When the speed changing unit 700 is not connected, the sheet transfer speed V2 corresponding to the printing speed of the laser printer 800 is set up (J203), and the sheet diverters 604 and 607 are set in such a manner that the sheet is transferred from the path 602 to the laser printer 800 (J204).

(V-J) Recognition Mode, etc. of each Optional Unit

In the process of the control processor of each optional unit such as the duplicator and the like, an identical data is transmitted from the controller 10 to the control processor (G102, H102, I102, and J102). In each optional unit, only the necessary data is selectively recognized to determine the operating process mode, and the corresponding inherent condition signals are applied to the interface controller 20 (G107, H107, I107, and J107). The contents of the recognition mode and the condition signals of each optional unit are as follows.

(a) Duplicator 200

<Recognition mode>

Duplication sheet size
Developing unit to be used
Size of the sheet stored in the sheet supply section
Magnification ratio of expansion and contraction <Condition signals>

Existence/nonexistence of developing unit
Existence/nonexistence of sheet
Error around the photosensitive drum
Open/close condition of the door
Jam of sheet
Ejection of sheet (b) Sheet supply unit 300

<Recognition mode>

Size of sheet stored in sheet supply section

<Condition signals>

Error of drive system
Existence/nonexistence of sheet
Jam of sheet (c) Sheet reversing unit 500

<Recognition mode>

Duplication mode
Sheet size

<Condition signals>

Error of drive system
Open/close condition of door
Ejection of sheet from the center tray (d) Sorter 600

<Recognition mode>

Bin to which sheet is ejected
Sheet size

<Condition signals>

Figure 26:
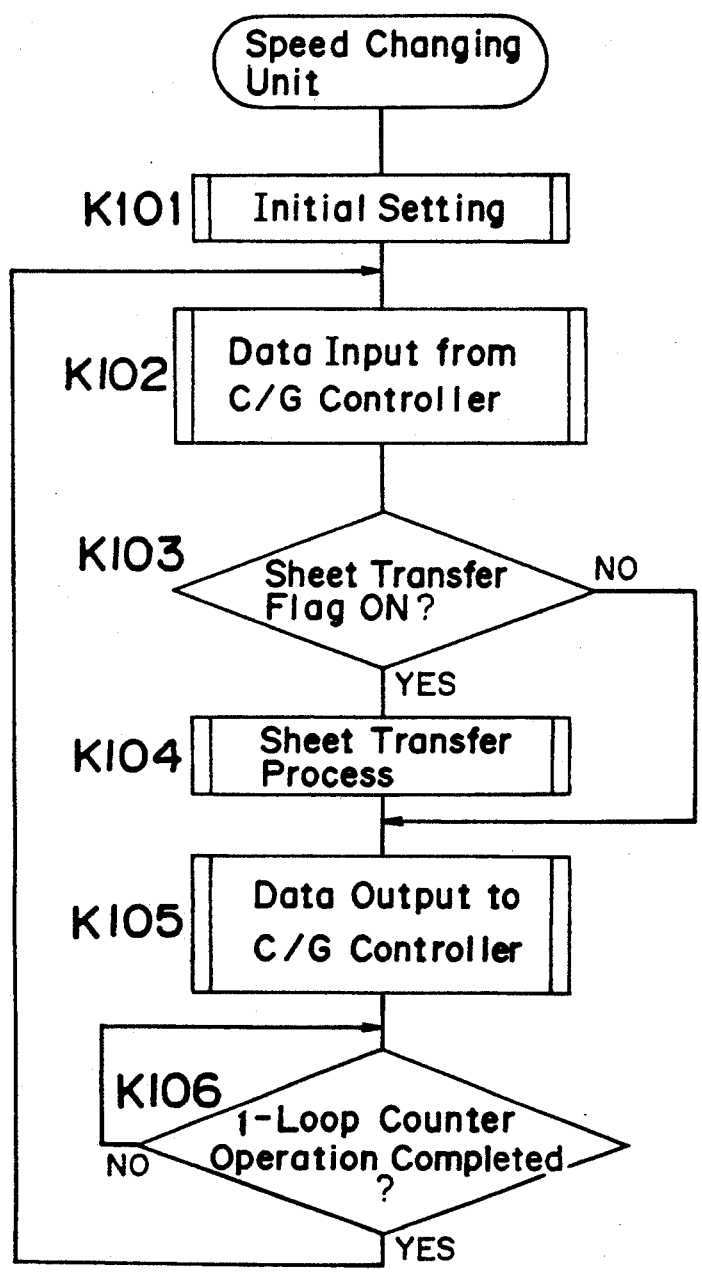
FIG. 26 is a flow chart of controlling the speed changing unit.

Error of drive system
Open/close condition of door
Jam of sheet
Ejection of sheet (V-K-1) Speed Changing Unit (Refer to FIG. 26)

In the control processor for controlling the speed changing unit 700, after initial setting of the control processor (K101), data is transmitted from the C/G controller 10 to the control processor (K102). Then it is judged whether the sheet transfer demand flag is set up (K103). When the sheet transfer demand flag is set up, a sheet transfer process as to be described later is carried out (K104) and the data such as the condition signals is applied to the C/G controller 10 (K105). When the sheet transfer demand flag is not set up, the data is applied to the C/G controller 10 without carrying out the sheet transfer process (K105). At the last step, it is judged whether the 1-loop counter operation is completed (K106). When the counter operation is completed, the process goes back to the step (K102) to be carried out again.

(V-K-2) Sheet Transfer Process (K104) (Refer to FIGS. 27 through 32)

Figure 27:
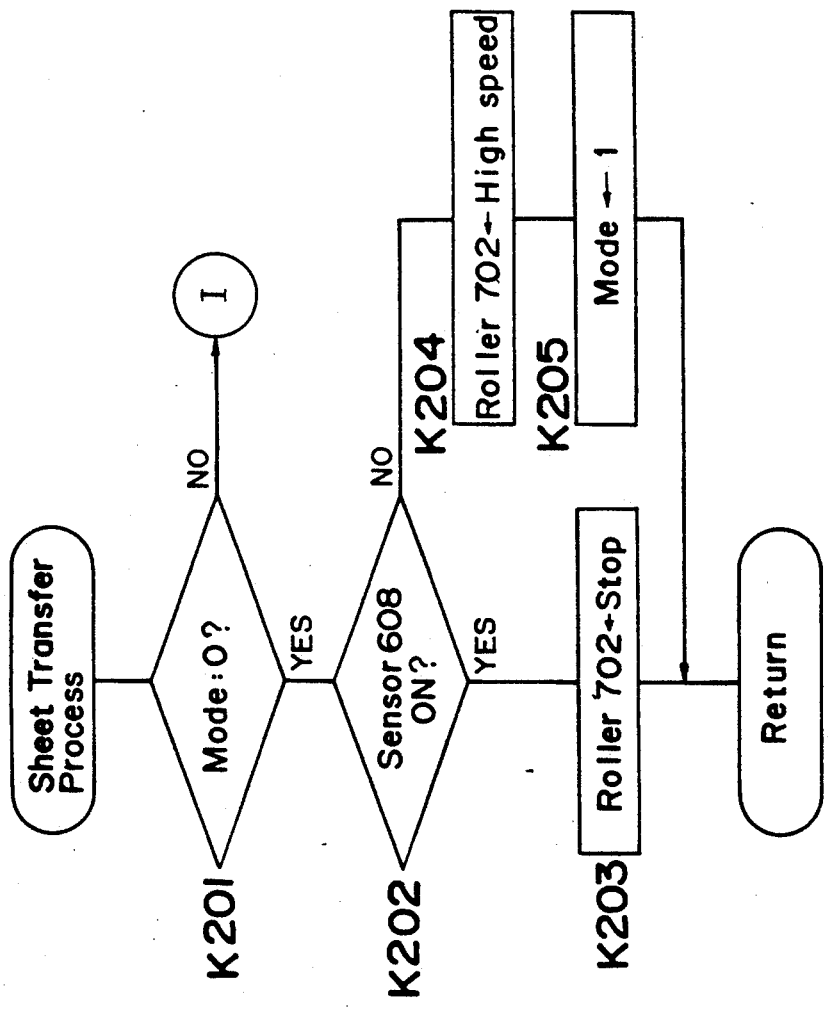
FIG. 27 is a flow chart of a sheet transfer process in controlling the speed changing unit.

In the sheet transfer process of (K104), firstly it is judged whether the sheet transfer mode is set to "0" (K201) as shown in FIG. 27. The sheet transfer mode is set to "0" when the power is turned on. When the sheet transfer mode is set to "0", it is judged whether the on edge status of the output signal of the sensor 608 is detected (K202). The term of "on edge" means the condition where the signal status changes from "off" to "on". When the on edge of the output signal of the sensor 608 is not detected, the rotations of the rollers 702, 703, and 704 are stopped until a sheet is transferred to the speed changing unit 700 (K203). When it is detected that the signal status of the sensor 608 is on edge, in other words, when the leading edge of the sheet is detected by the sensor 608, the rollers 702, 703, and 704 are rotated at a high speed to transfer the sheet to the path 701 at the sheet transfer speed V1 of the duplicator 200 (K204), and the status of the sheet transfer mode is changed to "1" (K205).

Figure 28:
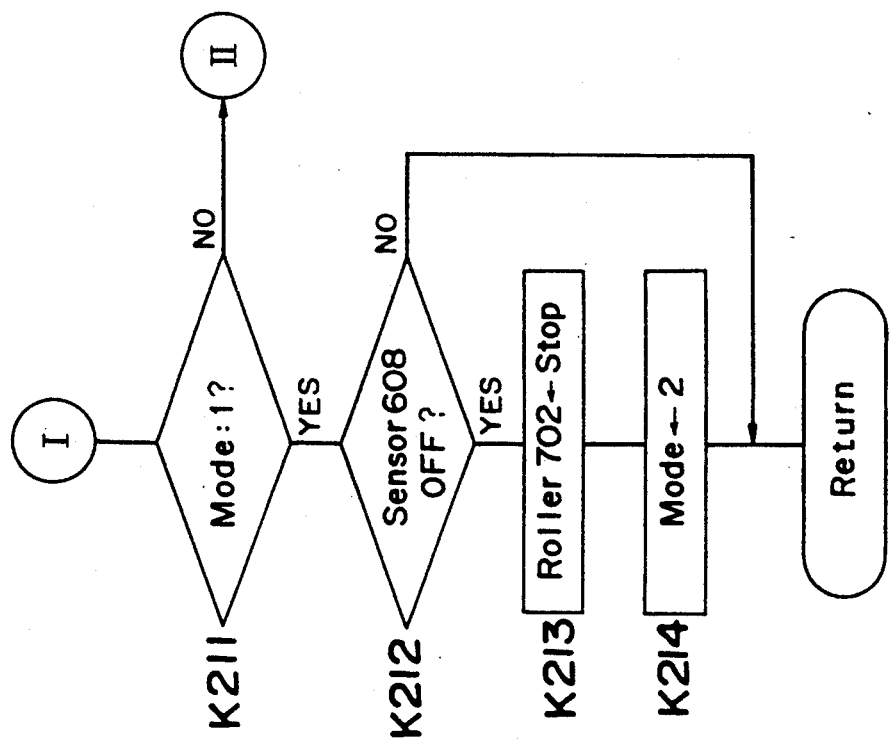
FIG. 28 is a flow chart of a sheet transfer process I in controlling the speed changing unit.

When the sheet transfer mode set to "1" (K211) in FIG. 28, the process goes to step (K212) and it is judged whether the off edge of the output signal of the sensor 608 is detected. The term of "off edge" means the condition where the signal status changes from "on" to "off". That is, it is detected in the step (K212) whether the trailing edge of the sheet transferred to the path 701 is transferred to the position corresponding to the sensor 608. When it is detected that the output signal of the sensor 608 is in off edge status and that the sheet is transferred to the position corresponding to the sensor 608, the rotations of the rollers 702, 703, and 704 are stopped (K213). In this condition, the trailing edge of the sheet has escaped from the high-speed sheet transfer region, and the status of the sheet transfer mode is changed to "2" (K214). When the off edge of the output signal of the sensor 608 is not detected, i.e., when the trailing edge of the sheet is transferred to the position facing to the sensor 608, the rollers 702, 703, and 704 continue to rotate at the high speed.

Figure 29:
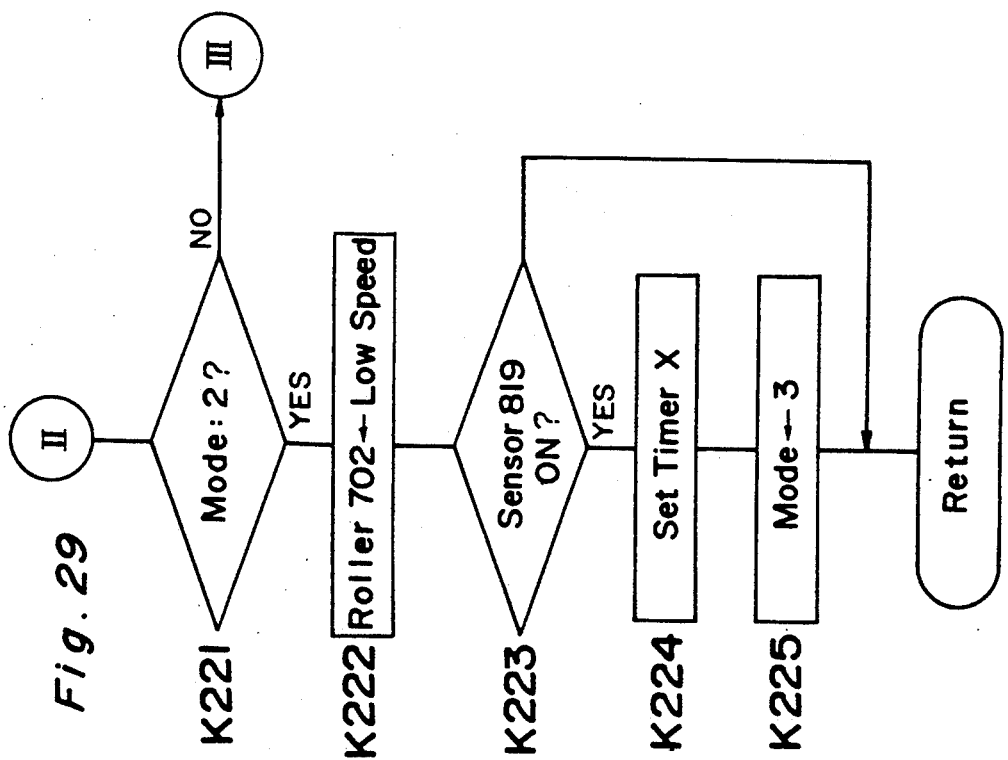
FIG. 29 is a flow chart of a sheet transfer process II in controlling the speed changing unit.

In FIG. 29, when it is judged that the sheet transfer mode is set to "2" (K221), the rollers 702, 703, and 704 are rotated at the low speed to transfer the sheet to the laser printer 800 at the sheet transfer speed V2 of the laser printer 800 (K222). Then it is judged whether the output signal of the sensor 819 is in on edge status, i.e., it is judged whether the sheet is transferred to just before the timing roller 808 (K223). When it is detected that the output signal of the sensor 819 is in on edge status, a timer X is set up (K224) so that the sheet is transferred during the time set up at the timer X. The above timer X is determined by taking into account the time to transfer extra sheets for the purpose of forming a loop of sheets for skew compensation added to the time for transferring the sheet transfer from the position corresponding to the sensor 819 to the timing roller 808. Subsequently, the status of the sheet transfer mode is changed to "3" (K225). When the on edge of the output signal of the sensor 819 is not detected in the step (K223), the present status is maintained.

Figure 30:
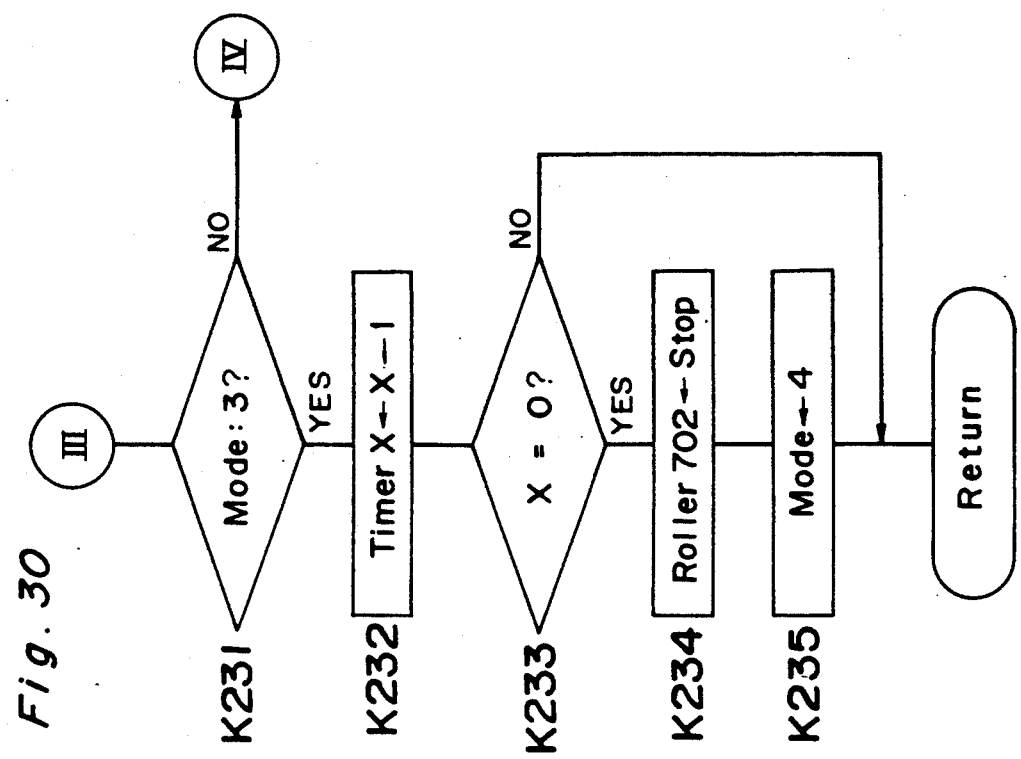
FIG. 30 is a flow chart of a sheet transfer process III in controlling the speed changing unit.

In FIG. 30, when it is judged that the sheet transfer mode is set to "3" (K231), the time set at the timer X is reduced by 1 (K232) and it is judged whether the operation of the timer X is completed (K233). When the operation of the timer X is not completed, the sheet transfer condition is maintained. When the operation of the timer X is completed, the rotations of the rollers 702, 703, and 704 are stopped (K234) and the sheet transfer mode is changed to "4" (K235).

Figure 31:
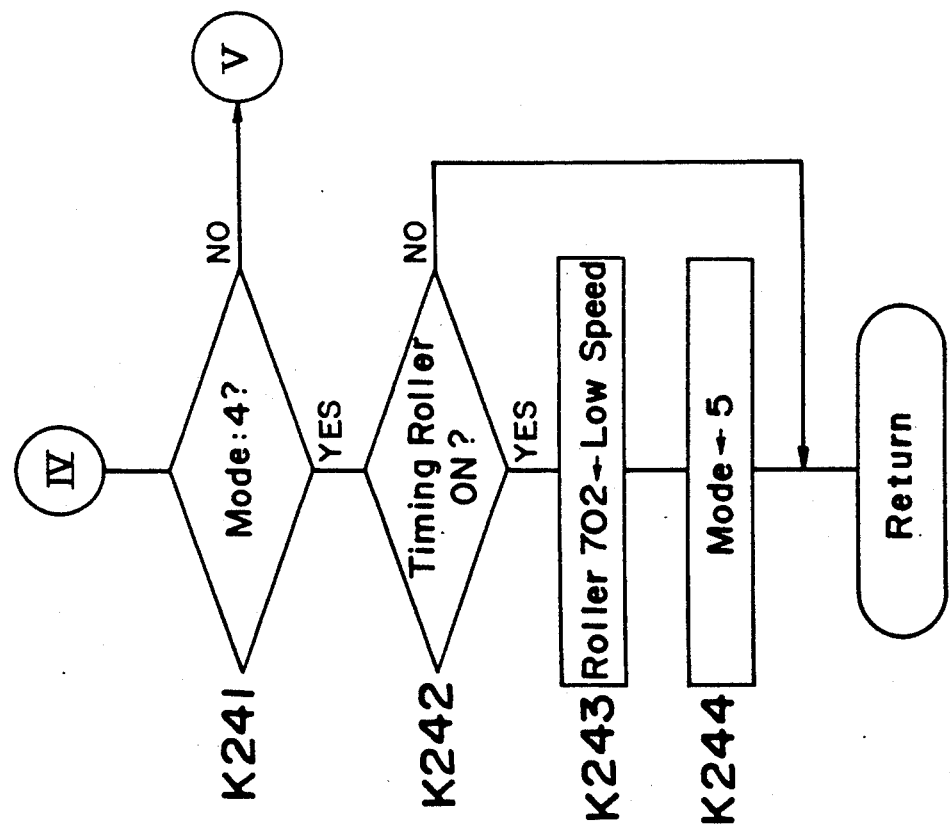
FIG. 31 is a flow chart of a sheet transfer process IV in controlling the speed changing unit.

In FIG. 31, when it is judged that the sheet transfer mode is set to "4" (K241), the process goes to the step (K242) and it is judged whether the timing roller 808 is rotating. When the timing roller 808 is not rotating, the process returns and the current condition is maintained. When the timing roller 808 is rotating, the rollers 702, 703, and 704 are rotated at the low speed (K243), and the sheet transfer mode is changed to "5" (K244).

Figure 32:
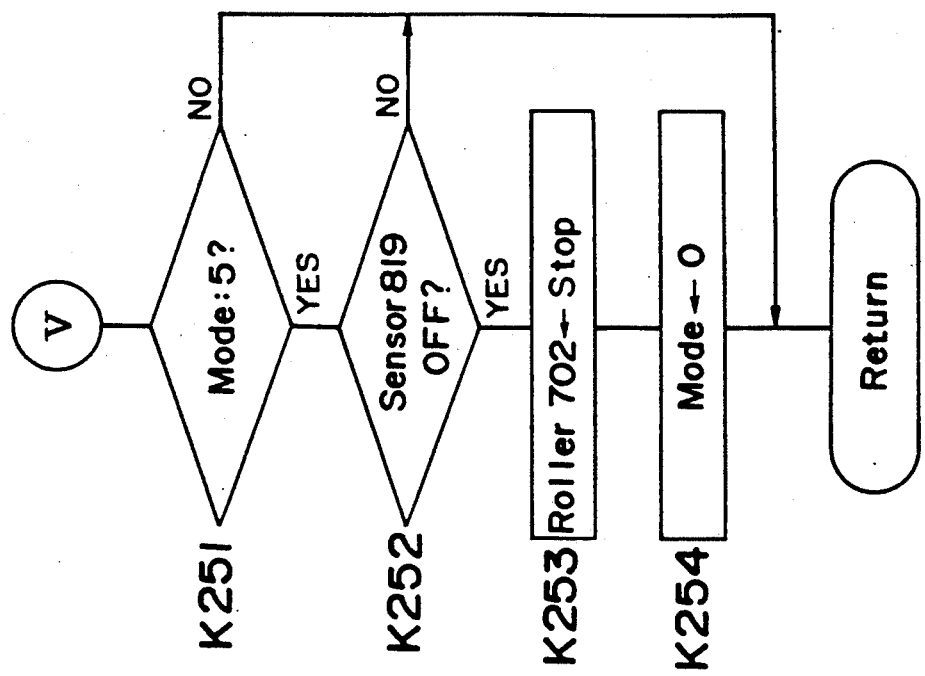
FIG. 32 is a flow chart of a sheet transfer process V in controlling the speed changing unit.

In FIG. 32, when it is judged that the sheet transfer mode is set to "5" (K251), the process goes to the step (K252) and it is judged whether the off edge of the output signal of the sensor 819 is detected, i.e., whether the trailing end of the sheet has passed through the sensor position. When the trailing end of the sheet is not detected, the sheet transfer condition is maintained. When the trailing end of the sheet is detected, the rotations of the rollers 702, 703, and 704 are stopped (K253), and the sheet transfer mode is changed to "0" (K254).

As described above, when an original sheet is supplied via the speed changing unit 700 to the laser printer 800, the sheet is transferred at the sheet transfer speed V1 (high speed) of the duplicator 200 when passing through the sorter 600, and the sheet transfer speed V1 is changed to the sheet transfer speed V2 (low speed) of the laser printer 800 when the sheet is transferred in the speed changing unit 700.

As obvious from the above description, according to the first aspect of the present invention, the complex machine comprises a host computer; a duplicator; a sheet supply unit having a plurality of sheet supply sections; a laser printer having a process speed lower than the process speed of the duplicator; and an automatic document feeder for feeding an original sheet formed by the laser printer to a duplicating position on a original sheet glass table located above the duplicator, wherein the complex machine is operated by setting various modes consisting of a single mode for independently driving the duplicator or the laser printer into a single operation to form an image; a composite mode for supplying a sheet from the sheet supply unit to the laser printer according to the original sheet size information transmitted from the host computer; and a speed changing mode for changing the speed of transferring a sheet to the laser printer from a sheet transfer speed corresponding to the duplicator into a sheet transfer speed corresponding to the laser printer in the process of the composite mode.

With the above construction, when no sheet of the desired size exists in the laser printer, a sheet of the desired size is supplied from the sheet supply unit to the laser printer. On the other hand, the sheet supplied from the sheet supply unit is transferred to the laser printer after the transfer speed thereof is converted from the high speed of the duplicator into the low speed of the laser printer.

In other words, in the complex machine in accordance with the present invention, the transfer speed of the sheet supplied from the sheet supply unit to the laser printer is converted into the process speed (sheet transfer speed) of the laser printer, which enables an organic combination between the high-speed duplicator and the compact low-speed printer having different sheet transfer speeds each other.

According to the second aspect of the present invention, the complex machine comprises a host computer; a duplicator; a printer which operates according to a command transmitted from the host computer; and a sheet supply unit, wherein the complex machine is operated by setting any one of sheet supply modes consisting of a first sheet supply mode for supplying a sheet from the sheet supply unit to the duplicator and a second sheet supply mode for supplying a sheet from the sheet supply unit to the printer, and wherein the complex machine comprises a sheet transfer mode selecting means for setting any one of the modes consisting of an interruption mode in which the sheet supply mode currently set up is interrupted to proceed to a selected sheet supply mode, a wait mode in which the selected sheet supply mode is effected after completing the process of the sheet supply mode currently set, and a rejection mode in which proceeding to the selected sheet supply mode is rejected when either one of the first sheet supply mode and the second sheet supply mode is currently set up and the other sheet supply mode is selected concurrently.

With the above construction, arbitrary selection among the interruption mode, the wait mode, and the rejection mode can be enabled by the sheet transfer mode selecting means, which results in improvement of usability.

In other words, by selecting the interruption mode, when the selected mode is different from the current mode of the first sheet supply mode or the second sheet supply mode, the current mode is interrupted and changed to the selected mode. Therefore, for example, when the current sheet supply mode is not in an urgent demand, the other sheet supply mode can effected preferentially.

When the wait mode is selected, proceeding to the selected sheet supply mode is effected after the current sheet supply mode of the first sheet supply mode or the second sheet supply mode is completed, which enables to complete the process in the current sheet supply mode and to automatically proceed to the selected sheet supply mode after completion of the process in the current sheet supply mode thereby to securely put the newly selected sheet supply mode into operation.

When the rejection mode is selected, only the process of the current sheet supply mode can be securely carried out.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A complex machine comprising:
   duplicating means for forming a copy of an original document placed on an original placing table;
   printing means for forming a printed image on a sheet depending on an electric signal applied from an external portion;
   sheet supply means for supplying a sheet at a first speed for forming a copy of an original image thereon;
   first transfer means for transferring the sheet supplied by said sheet supply means to said duplicating means at the first speed;
   speed changing means for changing the transfer speed of the sheet supplied by said sheet supply means from the first speed into a second speed; and
   second transfer means for transferring the sheet to said printing means at the second speed after the transfer speed of the sheet is changed to the second speed by said speed changing means.

2. The complex machine as claimed in claim 1 further comprising an automatic document feeding device for transferring the image printed sheet formed by said printing means onto the original placing table.

3. The complex machine as claimed in claim 1, wherein said sheet supply means is capable of supplying a plurality of sorts of sheets.

4. A complex machine including duplicating means for forming a copy of an original document placed on an original placing table and printing means for forming a printed image on a sheet depending on an electric signal applied from an external portion, thereby enabling to transfer the image printed sheet formed by said printing means onto the original placing table of said duplicating means, said complex machine comprising:
   sheet storing means for storing the sheet for forming the copy of the image thereon;
   sheet supply means for supplying the sheet from said sheet storing means at a first speed;
   first transfer means for transferring the sheet supplied by said sheet supply means to said duplicating means at the first speed;
   speed changing means for changing the transfer speed of the sheet supplied by said sheet supply means from the first speed into a second speed;
   second transfer means for transferring the sheet to said printing means at the second speed after the transfer speed of the sheet is changed to the second speed by said speed changing means.

5. A complex machine comprising:
   first image forming means for forming an image at a first system processing speed;
   second image forming means for forming an image at a second system processing speed;
   sheet supply means for supplying a sheet at the first system processing speed;
   first transfer means for transferring the sheet supplied from said sheet supply means to said first image forming means at the first system processing speed;
   changing means for changing the transfer speed of the sheet supplied by said sheet supply means from the first system processing speed to the second system processing speed; and
   second transfer means for transferring the sheet to said second image forming means at the second system processing speed after the transfer speed of the sheet is changed to the second system processing speed by said changing means.

6. A complex machine comprising:
   first and second image forming means for forming an image on a sheet;
   sheet supply means for supplying a sheet to said first and second image forming means;
   first mode setting means for setting a first sheet supply mode in which the sheet is supplied from said sheet supply means only to said first image forming means;
   second mode setting means for setting a second sheet supply mode in which the sheet is supplied from said sheet supply means only to said second image forming means; and
   selecting means for selecting whether the process of the first sheet supply mode is interrupted to proceed to the process of the second sheet supply mode when the second sheet supply mode is selected during the first sheet supply mode currently set.

7. The complex machine as claimed in claim 6, wherein said first image forming means is duplicating means for forming a copy of an original document placed on an original placing table, and said second image forming means is printing means for forming a printed image depending on an electric signal applied from an external portion.

8. A complex machine comprising:
   first and second image forming means for forming an image on a sheet;
   sheet supply means for supplying a sheet selectively to one of said first and second image forming means; and
   mode selecting means for selectively setting one of an interruption mode and a rejection mode, wherein in said interruption mode, when there is a demand for supplying the sheet to said second image forming means during a process of supplying the sheet to said first image forming means, the process of supplying the sheet to said first image forming means is interrupted and is proceeded by a process of supplying the sheet to said second image forming means, and wherein in said rejection mode, when there is a demand for supplying the sheet to said second image forming means during the process of supplying the sheet to said first image forming means, the demand is rejected and the process of supplying the sheet to said first image forming means is continued.

9. A complex machine comprising:
   first and second image forming means for forming an image on a sheet;
   sheet supply means for supplying a sheet selectively to one of said first and second image forming means; and
   mode selecting means for selectively setting one of an interruption mode and a wait mode, wherein in said interruption mode, when there is a demand for supplying the sheet to said second image forming means during a process of supplying the sheet to said first image forming means, the process of supplying the sheet to said first image forming means is interrupted and is proceeded by a process of supplying the sheet to said second image forming means, and wherein in said wait mode, when there is a demand for supplying the sheet to said second image forming means during the process of supplying the sheet to said first image forming means, the process of supplying the sheet to said second image forming means is automatically started upon completion of the process of supplying the sheet to said first image forming means.

10. A complex machine comprising:

first and second image forming means for forming an image on a sheet;

sheet supply means for supplying a sheet selectively to one of said first and second image forming means; and mode selecting means for selectively setting one of an interruption mode, a wait mode and a rejection mode, wherein in said interruption mode, when there is a demand for supplying the sheet to said second image forming means during a process of supplying the sheet to said first image forming means, the process of supplying the sheet to said first image forming means is interrupted and is proceeded by a process of supplying the sheet to said second image forming means, and wherein in said wait mode, when there is a demand for supplying the sheet to said second image forming means during the process of supplying the sheet to said first image forming means, the process of supplying the sheet to said second image forming means is automatically started upon completion of the process of supplying the sheet to said first image forming means, and wherein in said rejection mode, when there is a demand for supplying the sheet to said second image forming means during the process of supplying the sheet to said first image forming means, the demand is rejected and the process of supplying the sheet to said first image forming means is continued until the same demand is once more effected after the process of supplying the sheet to said first image forming means is completed.

* * * * *